(12) United States Patent
Taylor et al.

(10) Patent No.: US 9,985,310 B2
(45) Date of Patent: *May 29, 2018

(54) MULTI-FUNCTION SOLID OXIDE FUEL CELL BUNDLE AND METHOD OF MAKING THE SAME

(75) Inventors: Owen S. Taylor, Acme, PA (US); Gregory E. Zymboly, Murrysville, PA (US)

(73) Assignee: Pittsburgh Electric Engines, Inc., Mount Pleasant, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/069,893

(22) Filed: Mar. 23, 2011

(65) Prior Publication Data
US 2011/0318658 A1  Dec. 29, 2011

Related U.S. Application Data

(63) Continuation of application No. 12/075,909, filed on Mar. 14, 2008, now Pat. No. 7,914,939, which is a
(Continued)

(51) Int. Cl.
*H01M 8/06* (2016.01)
*H01M 8/24* (2016.01)
(Continued)

(52) U.S. Cl.
CPC ........... *H01M 8/12* (2013.01); *H01M 8/0625* (2013.01); *H01M 8/243* (2013.01); *H01M 8/247* (2013.01); *Y02P 70/56* (2015.11); *Y10T 29/49108* (2015.01)

(58) Field of Classification Search
CPC ................. H01M 8/12; H01M 8/0625; H01M 8/243–8/247
(Continued)

(56) References Cited

U.S. PATENT DOCUMENTS

| 4,374,184 A | 2/1983 | Somers et al. |
| 4,520,082 A | 5/1985 | Makiel |

(Continued)

FOREIGN PATENT DOCUMENTS

| EP | 0 264 688 A1 | 4/1988 |
| EP | 0 481 813 A1 | 4/1992 |

(Continued)

*Primary Examiner* — Osei K Amponsah
(74) *Attorney, Agent, or Firm* — Goodwin Procter LLP

(57) ABSTRACT

A multi-function bundle having all of the basic support functions integrated therein can be used as a basic building block component, for example, in a fuel cell engine. The multi-function bundle is modular, easy to assemble, and able to withstand the physical and thermal shocks encountered in mobile applications. The multi-function bundle utilizes fully distributed fuel and oxidant supply systems which help to reduce temperature gradients throughout the array of fuel cells. The multi-function bundle may be comprised of a plurality of fuel cells, an oxidant supply system, a fuel supply system and a support structure which integrates the fuel cells, oxidant supply system, and fuel supply system into a single unit. The oxidant and fuel supply systems may be fully distributed. The fuel supply system may include one or more fuel feed tube assemblies which allow distributed internal fuel reformation and reduce temperature gradients throughout the array of fuel cells.

19 Claims, 27 Drawing Sheets

Related U.S. Application Data continuation of application No. 10/804,925, filed on Mar. 19, 2004, now Pat. No. 7,364,812.

(51) Int. Cl.
*H01M 8/12* (2016.01)
*H01M 8/0612* (2016.01)
*H01M 8/243* (2016.01)
*H01M 8/247* (2016.01)

(58) Field of Classification Search
USPC .................................. 429/38, 31, 32, 34, 19
See application file for complete search history.

(56) References Cited

U.S. PATENT DOCUMENTS

| | | | |
|---|---|---|---|
| 4,640,875 A | 2/1987 | Makiel | |
| 4,728,584 A * | 3/1988 | Isenberg | 429/456 |
| 4,808,491 A | 2/1989 | Reichner | |
| 4,812,373 A | 3/1989 | Grimble et al. | |
| 4,827,606 A | 5/1989 | Szreders et al. | |
| 4,833,045 A | 5/1989 | Pollack et al. | |
| 4,874,678 A | 10/1989 | Reichner | |
| 4,876,163 A | 10/1989 | Reichner | |
| 4,885,078 A | 12/1989 | Spengler et al. | |
| 4,888,254 A | 12/1989 | Reichner | |
| 4,894,297 A | 1/1990 | Singh et al. | |
| 4,898,792 A | 2/1990 | Singh et al. | |
| 4,943,494 A | 7/1990 | Riley | |
| 4,983,471 A | 1/1991 | Reichner et al. | |
| 5,047,299 A | 9/1991 | Shockling | |
| 5,082,751 A | 1/1992 | Reichner | |
| 5,169,730 A | 12/1992 | Reichner et al. | |
| 5,258,240 A | 11/1993 | Di Croce et al. | |
| 5,306,574 A | 4/1994 | Singh et al. | |
| 5,366,819 A | 11/1994 | Hartvigsen et al. | |
| 5,480,738 A | 1/1996 | Elangovan et al. | |
| 5,498,487 A | 3/1996 | Ruka et al. | |
| 5,527,631 A | 6/1996 | Singh et al. | |
| 5,573,867 A | 11/1996 | Zafred et al. | |
| 5,686,196 A | 11/1997 | Singh et al. | |
| 5,741,605 A | 4/1998 | Gillett et al. | |
| 5,763,114 A | 6/1998 | Khandkar et al. | |
| 5,928,805 A | 7/1999 | Singh et al. | |
| 6,001,501 A * | 12/1999 | Collie | H01M 8/0247 429/160 |
| 6,025,083 A | 2/2000 | Veyo et al. | |
| 6,280,869 B1 | 8/2001 | Chen | |
| 6,296,962 B1 * | 10/2001 | Minh | H01M 8/0254 429/456 |
| 6,379,831 B1 * | 4/2002 | Draper | H01M 8/0232 429/129 |
| 6,444,339 B1 | 9/2002 | Eshraghi | |
| 6,444,342 B1 | 9/2002 | Doshi et al. | |
| 6,495,279 B1 | 12/2002 | Bogicevic et al. | |
| 6,610,434 B1 | 8/2003 | Draper et al. | |
| 7,226,675 B2 * | 6/2007 | Ovshinsky et al. | 429/9 |
| 2002/0110716 A1 | 8/2002 | Holmes et al. | |
| 2003/0054209 A1 | 3/2003 | Gillett et al. | |
| 2003/0148160 A1 * | 8/2003 | Song | H01M 8/1213 429/466 |
| 2003/0203263 A1 | 10/2003 | Brown et al. | |
| 2003/0235745 A1 | 12/2003 | Mook et al. | |
| 2004/0234830 A1 * | 11/2004 | Draper et al. | 429/30 |

FOREIGN PATENT DOCUMENTS

| | | | | |
|---|---|---|---|---|
| GB | 2339063 A * | 1/2000 | | H01M 8/04 |
| WO | 99/54951 | 10/1999 | | |

* cited by examiner

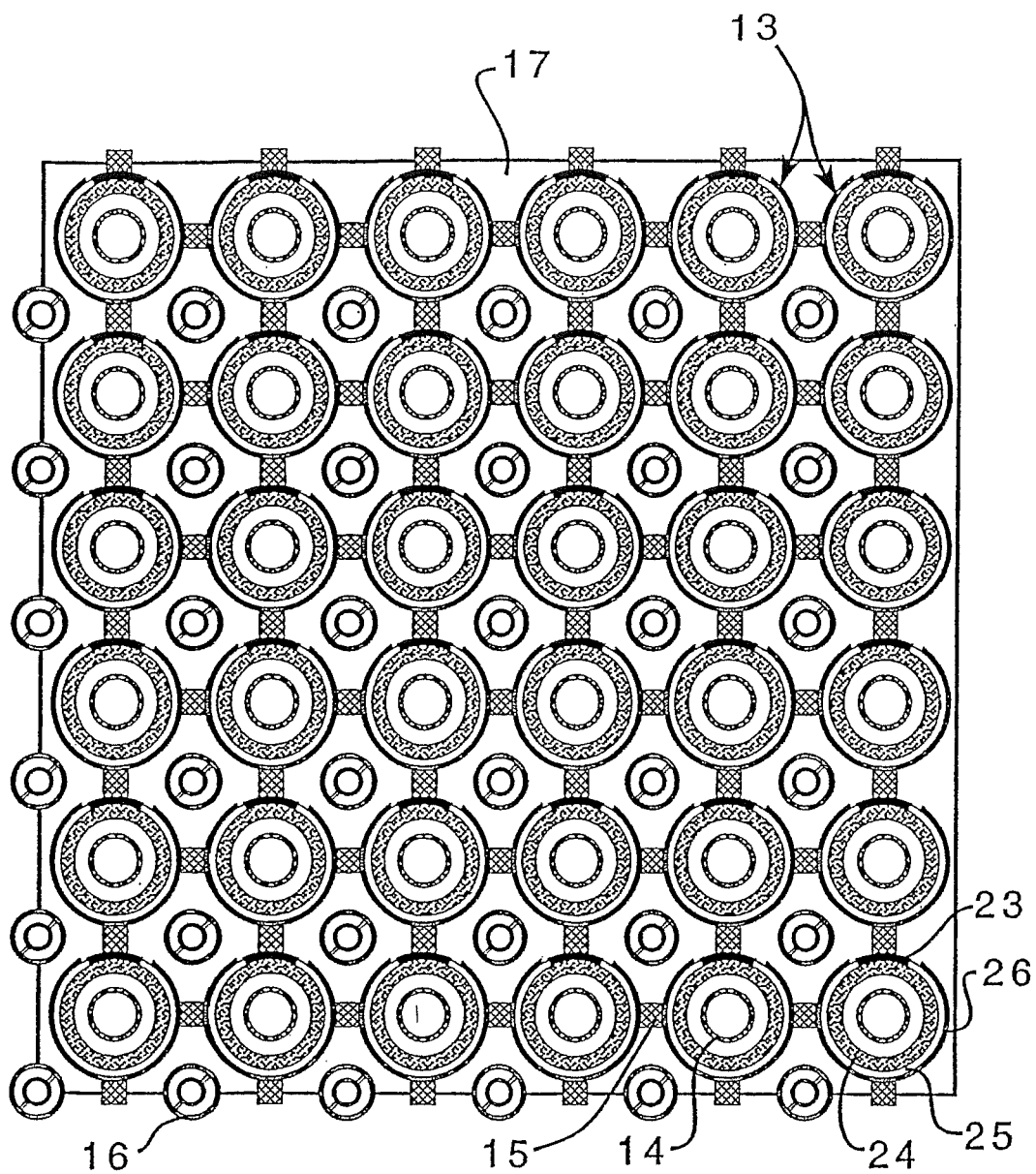
Figure 6-B

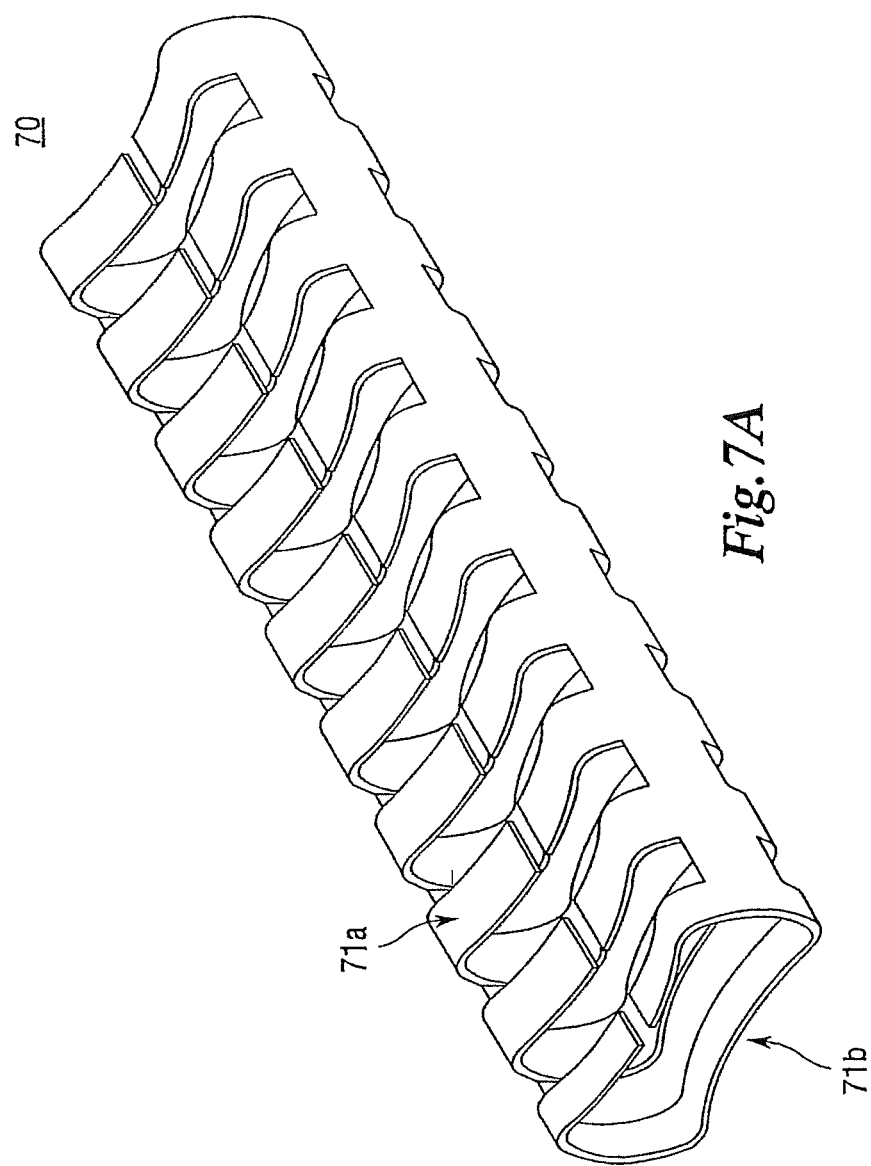

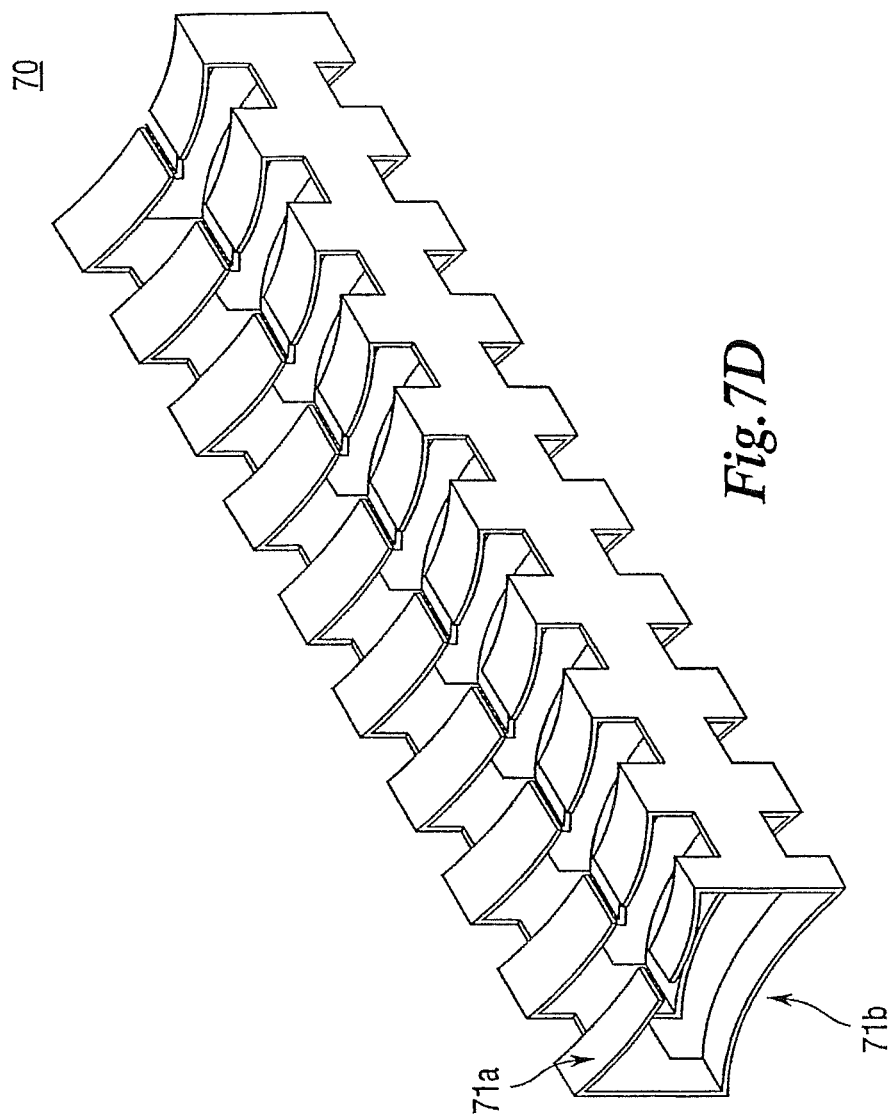

MULTI-FUNCTION SOLID OXIDE FUEL CELL BUNDLE AND METHOD OF MAKING THE SAME

This application is a continuation of U.S. application Ser. No. 10/804,925 entitled Multi-Function Solid Oxide Fuel Cell Bundle and Method of Making the Same filed Mar. 19, 2004.

BACKGROUND OF THE INVENTION

The present invention relates generally to fuel cells and more particularly to a multi-function fuel cell bundle having all of the basic support functions integrated therein.

Internal combustion engines have evolved to the point where advancements are not effective because of fundamental limitations in the basic technology. Several technologies (e.g., electric engines, hydrogen engines, gas/electric hybrid engines, fuel cell engines, etc.) have been proposed as possible substitutes for the internal combustion engine. Of the proposed technologies, fuel cells perhaps offer the most attractive solution for replacing the internal combustion engine. In addition to increased efficiency and decreased pollution, fuel cells are capable of using the same fuel sources (e.g., gasoline, diesel, natural gas, etc.), and thus existing fuel distribution networks, that are currently used by the internal combustion engine. Therefore, conversion to fuel cells is a more cost effective solution than the other proposed technologies.

A fuel cell combines fuel and air in an electrochemical reaction that produces both electricity and heat. Typically, a fuel cell is comprised of an electrolyte sandwiched between two electrodes (i.e., positive and negative terminals). The electrodes have pores that allow fuel, air, and reaction products to flow with minimal flow resistance. The electrodes are good electrical conductors (i.e., have minimal resistance) and may also act as catalysts to increase the rate of the electrochemical reaction within the fuel cell.

Fuel cells are typically classified according to the type of electrolyte employed. For example, proton exchange membrane fuel cells (PEMFC) typically use synthetic polymers as an electrolyte, phosphoric acid fuel cells (PAFC) use a phosphoric acid (similar to a car battery), molten carbonate fuel cells (MCFC) typically use a molten alkali carbonate of potassium hydroxide solution, and solid oxide fuel cells (SOFC) typically use a solid ceramic made mostly of zirconia.

The type of fuel used by a fuel cell may vary. Generally, the fuel can be any substance that is capable of being reacted with oxygen (i.e., burned) and is capable of flowing through the porous electrode structure. Gaseous hydrogen is typically the most desirable fuel for use within fuel cells. Because gaseous hydrogen is somewhat difficult and dangerous to transport, however, an adequate fuel distribution system is not currently available for gaseous hydrogen. Distribution systems do exist, however, for common hydrocarbon fuels such as natural gas, gasoline, and diesel. These fuels are composed of particular combinations of hydrogen and carbon (hence the name "hydrocarbon"). Gaseous hydrogen can be extracted from these hydrocarbon fuels for use by a fuel cell through a process called reformation.

Reformation generally refers to the conversion of common hydrocarbon fuel into a different form. One common type of reformation that is employed is known as steam reformation. During steam reformation, water is heated to a high temperature to form steam which is then mixed with the hydrocarbon fuel. The water/steam ($H_2O$) provides a source of oxygen that combines with the carbon in the hydrocarbon, to form $CO_2$ and CO. Thus, the reformation process produces $CO_2$, CO, and hydrogen. Although most of the hydrogen is supplied by the hydrocarbon, a significant portion may come from the water/steam.

The fuel reformation process may be divided into two parts: partial reformation and final reformation. Partial reformation represents breaking down (reforming) a long chain hydrocarbon fuel to a first level. Final reformation represents breaking down (reforming) the particular compound formed by partial reformation to a final reformed fuel.

The distinction between partial and final reformation can be made due to the way the two parts of the reformation process are carried out. Partial reformation is typically performed by a partial reformer which employs a bed of suitable catalyst material such that the rate of heat absorbed by the reforming fuel mixture does not exceed the level at which carbon will precipitate (i.e., so coking does not occur). Final reformation is typically performed by a final reformer which has no heat transfer limitations and can therefore absorb heat at high rates without precipitating carbon (i.e., without coking).

Although fuel cells offer a promising alternative to internal combustion engines, the application of fuel cell technology to create a viable fuel cell engine has proven to be very difficult. Each type of fuel cell has inherent limitations which impede its adaptation for use as an alternative to the internal combustion engine. For example, PEMFC's and PAFC's are classified as low-temperature fuel cells because they operate at approximately 180 degrees Fahrenheit and 360 degrees Fahrenheit, respectively. At these temperatures, the PEMFC and PAFC engines require separate, external hydrocarbon fuel reformation equipment to supply reformation heat to the fuel. Typically, the reformation heat is extracted directly from the fuel, thus reducing engine efficiency. Furthermore, the additional weight and space needed to house the external reformation system make PEMFC and PAFC engines impractical as replacements for internal combustion engines.

In contrast, SOFCs operate at approximately 1800 degrees Fahrenheit and are classified as high temperature fuel cells. SOFCs are capable of providing their own reformation heat. The reformation heat can be efficiently extracted from the SOFCs exhaust, or through convection and/or radiation from the cell itself, thus offering improved efficiency over PEMFC and PAFC engines and eliminating the need for external reformation systems. Accordingly, SOFCs are more promising than PEMFC and PAFC engines for replacing the internal combustion engine.

Typical SOFCs are constructed in either a tubular or planar configuration. In a planar configuration, the electrolyte is sandwiched between two electrode "plates." An inherent problem with the planar configuration is that, near the edges of the plates, the reactants (fuel and air) are in close proximity to each other without an electrolyte material to prevent the reactants from chemically combining (as opposed to electrochemically combining through the electrolyte). Thus, the planar configuration requires sophisticated edge seals to prevent the reactants from chemically combining.

The tubular configuration eliminates the need for sophisticated edge seals. In a simplified example, a tubular SOFC is formed by rolling the thin sheet-like layers of electrodes and electrolyte into a tube such that the edges at one end of the sheet-like layer meet the corresponding edges from the opposite end of the sheet-like layer. The result is a composite tube that consists of three basic layers, where one of the porous electrodes (e.g. the fuel electrode) is on the outside of the cell, the other porous electrode (e.g., the oxidant electrode) is on the inside of the cell, and the electrolyte is sandwiched between the two electrodes. Typically, one end of the tube is closed to further reduce edge sealing problems.

During operation, fuel is supplied to the fuel electrode, whereas an oxidant (i.e., feed air or oxygen) is supplied to the oxidant electrode. The fuel and oxidant pass through the pores of their respective electrodes and electrochemically react on the surface of the electrolyte, thereby producing heat and electricity.

The configurations for various SOFCs and for various stationary SOFC generators are taught, for example, by Isenberg in U.S. Pat. No. 4,490,444, Isenberg in U.S. Pat. No. 4,664,987, Makiel in U.S. Pat. No. 4,640,875, Somers et al. in U.S. Pat. No. 4,374,184, and Singh et al. in U.S. Pat. No. 4,894,297. In all of these patents, an axially elongated, tubular air cathode has a solid oxide electrolyte deposited over it. A small radial segment which contains a deposit of interconnection material down the length of the tube is placed in contact with the air electrode. A fuel anode forms an outer layer over the electrolyte completing the fuel cell. A current collector felt with metal fibers may be attached to the interconnection material. Other fuel cell configurations are also known, such as those taught by Isenberg, in U.S. Pat. No. 4,728,584.

One or more fuel cells may be grouped together to form a cell bundle. The current collector felt of each cell in the bundle may be electrically connected to its neighbor in series and parallel. For example, the cells in each row may be connected in series to the other cells in that row. Each row may be then connected in parallel with the other rows in the cell bundle.

The generators discussed in the above-mentioned patents are typically used in stationary settings (for example, within a power plant) or are designed to provide power for relatively stable loads (for example in large marine applications that have a large hotel load). Thus, these generators may not be easily adapted to withstand the physical shock (for example, caused by a bumpy road) and thermal shock (for example, caused by frequent load swings) encountered by an internal combustion engine for a transportation application.

Additionally, assembly of prior art SOFC generators is time consuming and complex, making their use as a replacement for the internal combustion engine cost prohibitive. Typically, prior art SOFC generators must be assembled from individual parts within the confines of a housing which surrounds the generator. Conventional assembly procedures require excessive handling of the fuel cells and require extra space in the generator housing for assembly clearance. To reduce assembly time, the individual fuel cells may be combined to form a basic cell bundle prior to insertion into the generator housing. Multiple basic cell bundles may then be combined to form a fuel cell stack within the generator housing. However, the assembly of the generator is further complicated because each cell in the stack must be connected to, for example, an oxidant supply, a fuel supply, cell supports, generator walls, recirculation tubing, exhaust tubing, combustion chambers, and an external fuel reformer, among others.

Another problem with prior art generators is that the fuel reformation systems are not fully distributed (i.e., each cell within the cell stack is not directly coupled with the same amount of fuel reformation). Some cells may be cooled much more than others as a result of non-uniform fuel reformation. As a consequence, cells that do not transfer heat for fuel reformation may operate at a higher temperature than the cells that do transfer heat for fuel reformation. Thus, large variations in temperature may occur throughout the cell stack causing additional thermal stresses within the generator and/or reducing the performance of certain cells.

Thus, there exists a need for a multi-function bundle having all of the basic support functions integrated therein which can be used as a component in a fuel cell engine. A need also exists for a multi-function bundle that is modular, easy to assemble, and able to withstand the physical and thermal shocks encountered in a mobile application. A further need exists for a multi-function bundle that utilizes fully distributed fuel reformation systems to eliminate temperature variations throughout the bundle and that overcomes the other limitations inherent in prior art.

SUMMARY OF THE INVENTION

One aspect of the present invention relates to a multi-function bundle comprised of a plurality of fuel cells, an oxidant supply system, a fuel supply system, a fuel reformation system, and a support structure. The support structure integrates the plurality of fuel cells, oxidant supply system, fuel supply system, and fuel reformation system into a single unit.

Another aspect of the present invention relates to a multi-function bundle comprised of an elongated annular fuel cell having an oxidant electrode and a fuel electrode separated by an electrolyte. An oxidant feed tube is operable to supply an oxidant to the oxidant electrode, a fuel feed tube assembly is operable to supply fuel to the fuel electrode, and a support structure is operable to integrate the elongated annular fuel cell, oxidant feed tube, and fuel feed tube assembly.

Another aspect of the invention relates to a method for assembling a multi-function bundle comprised of attaching a cell spacer to a primitive bundle of fuel cells, attaching a recirculation box to the primitive bundle of fuel cells, combining a plurality of air feed tubes with an exhaust/air distribution box to form a feed tube—exhaust/air box assembly, attaching the feed tube—exhaust/air box assembly to the primitive bundle of fuel cells, combining a fuel box with a cell and fuel feed spacer to form a fuel box—cell and fuel feed spacer assembly, and attaching the fuel box—cell and fuel feed spacer assembly to the primitive bundle of fuel cells.

Another aspect of the present invention relates to a fuel cell stack comprised of a plurality of multi-function bundles arranged in one or more rows and columns, wherein each of the plurality of multi-function bundles includes a plurality of fuel cells, an oxidant supply system, a fuel supply system, a fuel reformation system, and a support structure for enabling the plurality of fuel cells, the oxidant supply system, the fuel supply system, and the fuel reformation system to operate as an integrated unit.

Another aspect of the present invention relates to a pressure containment vessel comprised of a base for supporting a plurality of multi-function fuel cell bundles and a cover having a side wall and a domed top, said domed top having one or more corrugations.

Another aspect of the present invention relates to a fuel cell engine comprised of a pressure containment vessel, and one or more multi-function fuel cell bundles.

Another aspect of the present invention relates to an assembly comprised of an entrance leg, a return leg, and a support fin, wherein the entrance leg, return leg, and support fin form a counter-flow heat exchanger and wherein the entrance leg and the return leg define a flow path for at least one of a fuel and an oxidant.

Another aspect of the present invention relates to a device for electrically connecting two or more tubular fuel cells comprised of an elongated conductive strip having a first contact for coupling with an outer surface of a tubular first fuel cell and having a second contact for coupling with an outer surface of a second tubular fuel cell.

BRIEF DESCRIPTION OF THE DRAWINGS

To enable the present invention to be easily understood and readily practiced, the present invention will now be described for purposes of illustration and not limitation, in connection with the following figures wherein:

FIG. 6B is a cut-away view of the multi-function bundle of FIG. 6A according to one embodiment.

FIG. 7A is a perspective view of a cell-to-cell electrical connector according to one embodiment.

FIG. 7D is a perspective view of a cell-to-cell electrical connector according to one embodiment.

DETAILED DESCRIPTION OF THE INVENTION

Figure 1A:
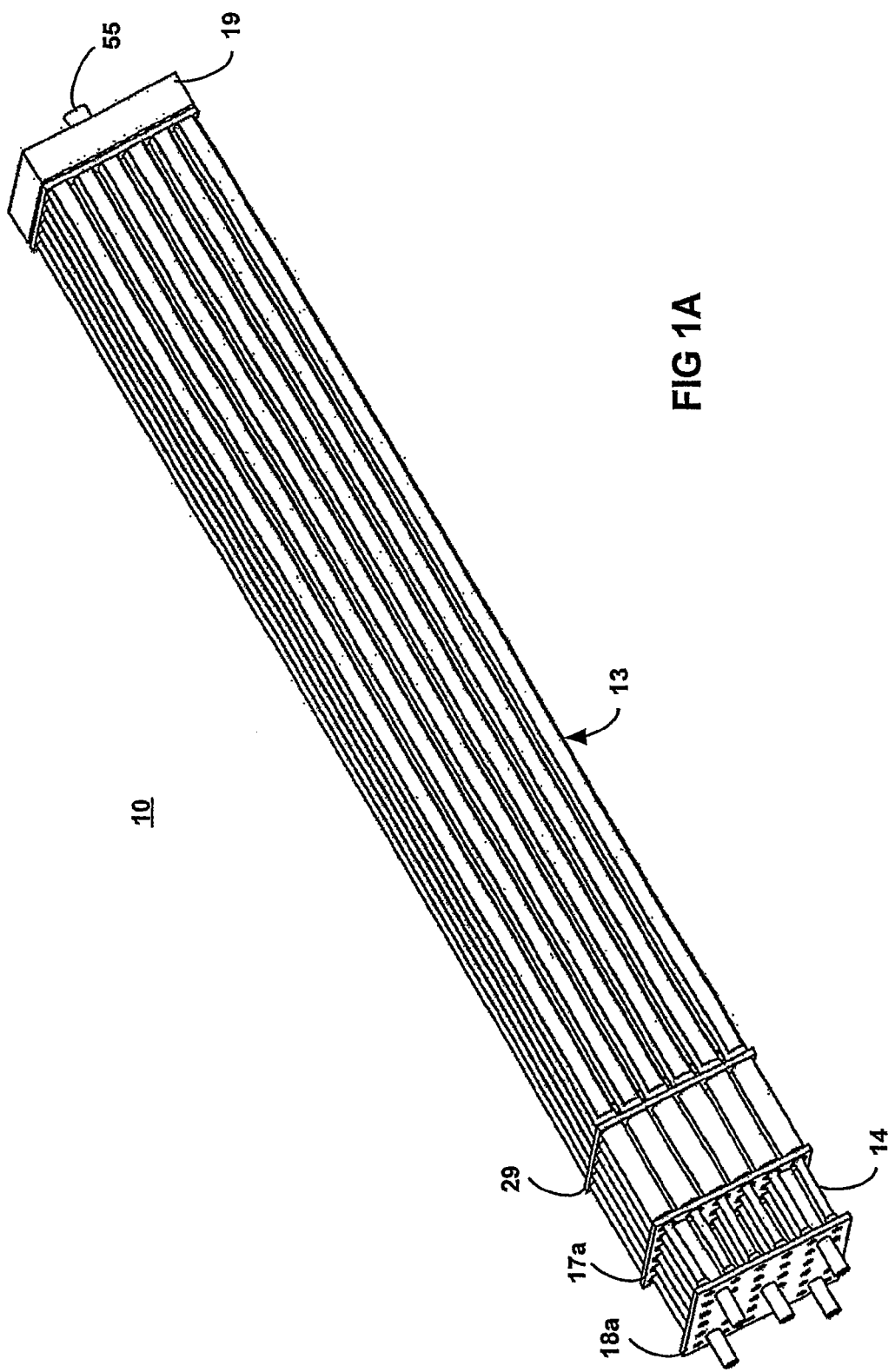
FIG. 1A is a perspective view of a multi-function bundle according to one embodiment.
Figure 15:
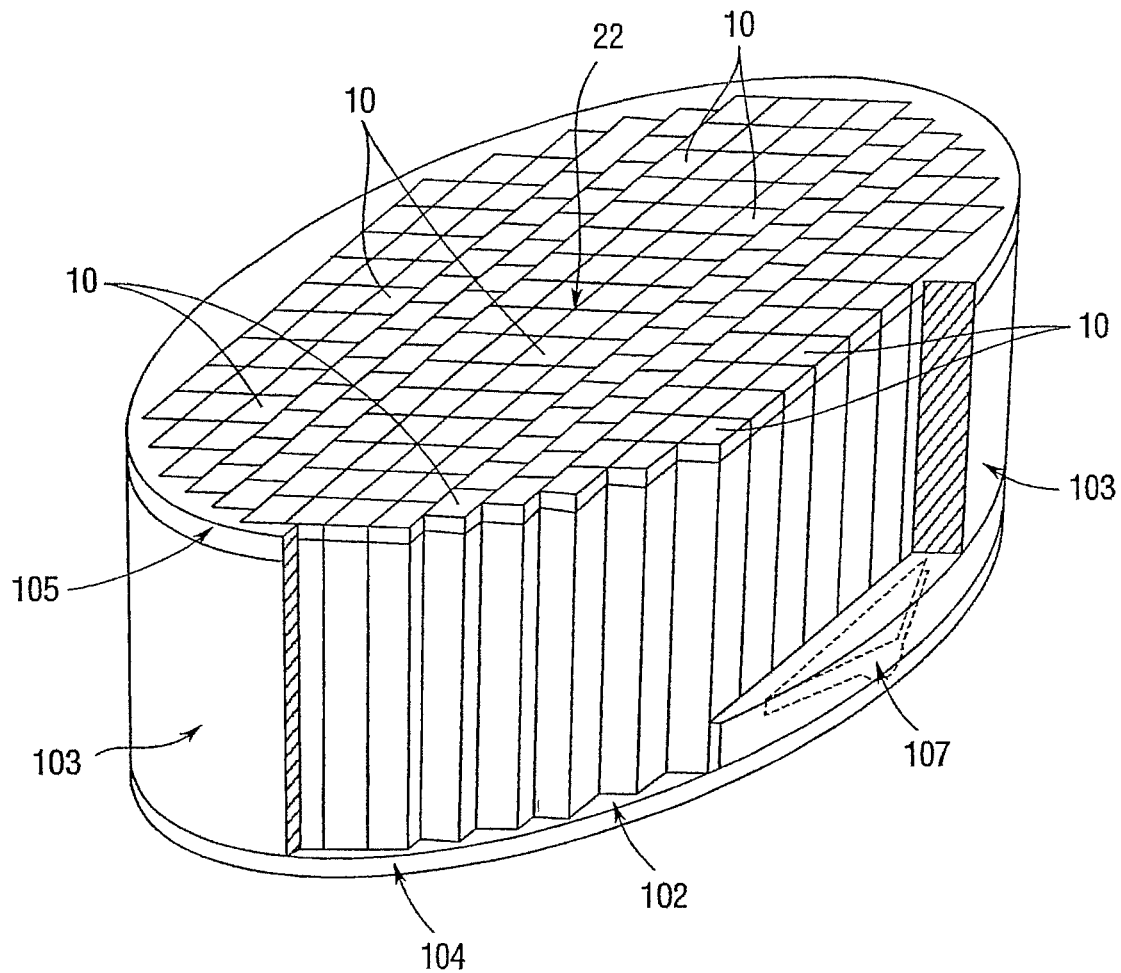
FIG. 15 is an isometric view of a stack of multi-function fuel cell bundles and associated support structures for the fuel cell engine of FIG. 13 according to one embodiment.

FIG. 1A is a perspective view of a multi-function bundle according to one embodiment. The multi-function bundle 10 embodies all of the basic support functions for the fuel cells 13 in a single, integrated unit. For example, the multi-function bundle may embody one or more of the following functions in a single, integrated unit: cell-to-cell electrical connections, oxidant distribution, fuel distribution, fuel reformation, process exhaust, process gas recirculation, and oxidant/fuel combustion, among others. Accordingly, the multi-function bundle 10 may be a modular unit that serves as a building block for building larger assemblies, for example, a generator stack (as best shown in FIG. 15). Thus, the multi-function bundle 10 reduces the effort needed (and eliminates extra costs typically encountered) during generator stack assembly and/or repair.

Figure 1B:
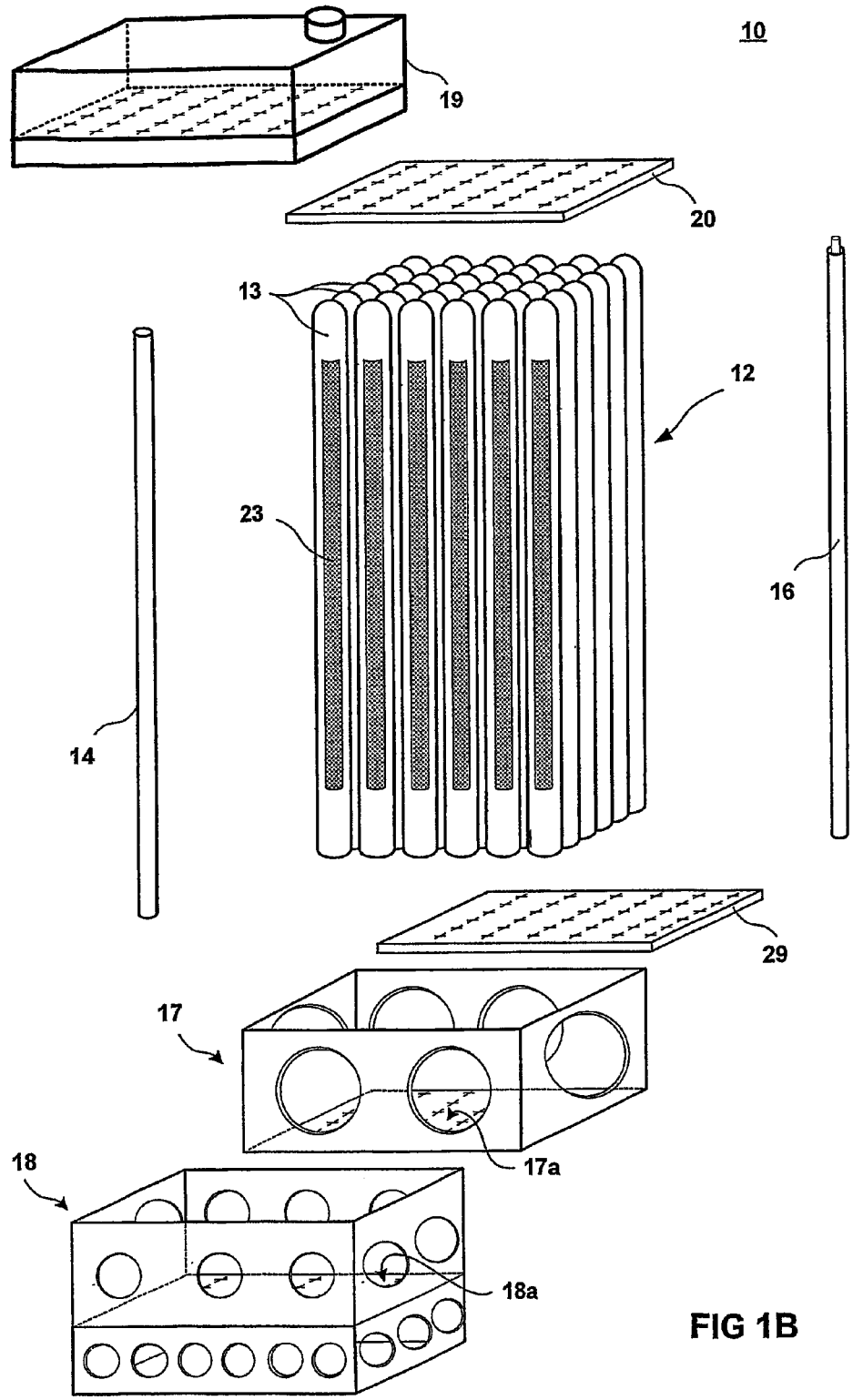
FIG. 1B is an exploded view of the multi-function bundle of FIG. 1A according to one embodiment.

FIG. 1B is an exploded view of the multi-function bundle 10 of FIG. 1A according to one embodiment. The multi-function bundle 10 is comprised of a primitive bundle 12 of fuel cells 13, oxidant feed tubes 14 (which may be positioned within fuel cells 13), fuel feed tube assemblies 16 (which may be positioned between and/or around fuel cells 13), a recirculation box 17, an exhaust/air distribution box (EAB) 18, a fuel box 19, a cell and fuel feed spacer (CFF Spacer) 20, and a cell spacer 29. The primitive bundle 12 may be comprised of a plurality of tubular solid oxide fuel cells (SOFCs) 13 each having an electrolyte 25 placed between oxidant 24 and fuel 26 electrodes, and an interconnection 23 contacting the oxidant electrode 24 (as best shown in FIG. 6B), the construction of which is well known in the art. The SOFCs 13 may be electrically connected to each other using flexible electrical connections 70, 72, 74 (not shown in FIG. 1B) that axially traverse each SOFC 13. The SOFCs 13 may be connected in series and/or in parallel within the primitive bundle 12.

It should be noted that the term "primitive bundle" 12 as used herein refers to a group of electrically connected fuel cells 13 and the term "multi-function bundle" as used herein refers to a primitive bundle 12 of fuel cells with fully distributed oxidant, fuel, and/or fuel reformation systems and an appropriate bundle support structure (e.g. 17, 18, 19, etc.). The bundle support structure enables the primitive bundle 12 and the oxidant supply, fuel supply, and fuel reformation systems to operate as an integrated unit. In one embodiment, the bundle support structure also provides separation and proper flow distribution between different process zones (as discussed in conjunction with FIG. 6A) within each multi-function bundle 10 and between two or more multi-function bundles 10, for example, when combined to form a stack.

As illustrated in FIG. 1B, the primitive bundle 12 is comprised of thirty-six (36) SOFCs 13 arranged in a six-by-six (6×6) array. The number of SOFCs 13 used in the primitive bundle 12, the array dimensions, and the manner of electrically connecting the individual SOFCs 13 within the primitive bundle 12 may be altered while remaining within scope of the present invention. Additionally, other types of fuel cells may be used while remaining within the scope of the present invention.

In one embodiment, the tubular SOFCs 13 also provide a means of holding the multi-function bundle 10 together (i.e., end-to-end) and help to accommodate thermal growth experienced by the multi-function bundle 10. However, other end-to-end support arrangements may be used while remaining within the scope of the present invention. For example, tie rods with thermal expansion characteristics similar to the SOFCs 13 may be embedded between and around the SOFCs 13. The end-to-end supports may be needed only during construction of the multi-function bundle 10, thus, the "embedded tie rods" may be made from a material that disintegrates when the multi-function SOFC bundle 10 is operated.

The multi-function bundle 10 has fully distributed oxidant supply, fuel supply, and/or fuel reformation systems. In the present discussion, a "fully distributed" oxidant supply system and a "fully distributed" fuel supply system refers to systems in which each SOFC 13 is provided with a desired amount of oxidant/fuel (e.g., an amount necessary for one SOFC 13 to produce an electrochemical reaction at the same rate/proportion as the other SOFCs 13 in the multi-function bundle 10). For example, in one embodiment, the multi-function bundle may be designed to electrochemically react approximately 75 to 85% of the fuel supplied to each SOFC. Accordingly, if each SOFC 13 is supplied with a given amount of fuel, then each SOFC 13 will be supplied with an amount of oxidant necessary to electrochemically react 75-85% of supplied fuel within the active region 32, an amount of oxidant to combust the remainder of the fuel in the combustion zone 36, and an amount of excess oxidant to maintain the desired temperature of the SOFC 13.

Additionally, in the present discussion, a "fully distributed" fuel reformation system refers to a system in which a portion of the fuel reformation system uses a portion of the heat generated by the electrochemical cell reaction to aid in reformation. For example in the current embodiment, fuel feed tube assemblies 16 may be located among the SOFCs 13. As the fuel mixture passes through the fuel feed tubes assemblies 16, it absorbs heat from the electrochemical cell reaction and is reformed into a hydrogen-rich fuel mixture. A fully distributed fuel reformation system may reduce parasitic heat loss, may minimize the cooling impact that the fuel reformation process has on the operation of the multi-function bundle 10, and may prevent localized adverse cooling within the multi-function bundle 10.

Figure 1C:
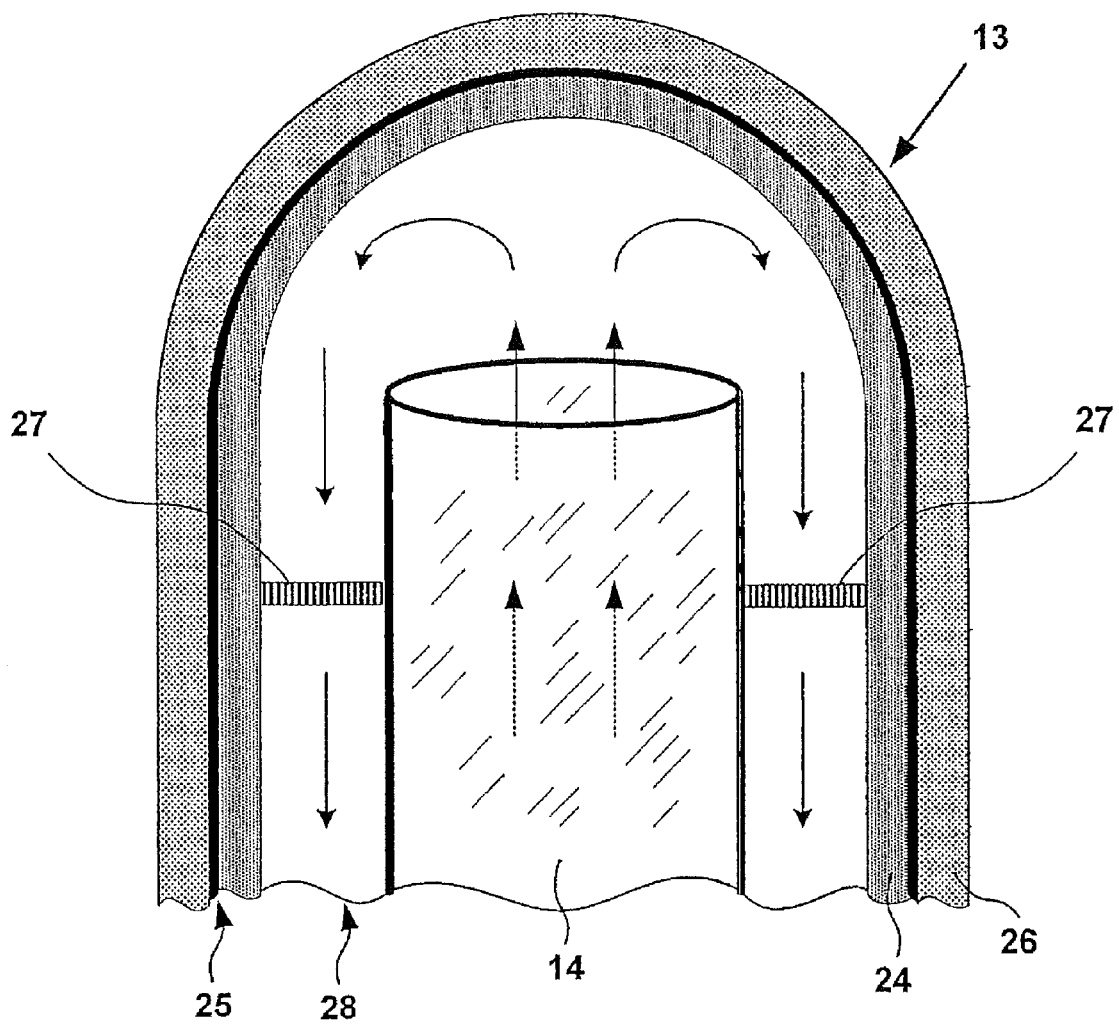
FIG. 1C is a detailed view of the closed end of an SOFC of FIG. 1A with an oxidant feed tube inserted therein according to one embodiment.

The oxidant supply system may include the oxidant feed tubes 14 and the EAB 18. Oxidant may be distributed, for example, by inserting an oxidant feed tube 14 within each SOFC 13. FIG. 1C is a detailed view of the closed end of an SOFC 13 with an oxidant feed tube 14 inserted therein according to one embodiment. The SOFC 13 is comprised of an oxidant electrode 24, an electrolyte 25, and a fuel electrode 26. Because the outer diameter of the oxidant feed tube 14 is less than the inner diameter of the SOFC 13, a cavity 28 is formed between the outer diameter of the oxidant feed tube 14 and the inner diameter of the SOFC 13 when the oxidant feed tube 14 is inserted within the SOFC 13. The outlet of the oxidant feed tube 14 is near, but not touching, the closed end of the SOFC 13. Thus, oxidant (represented by a series of arrows in FIG. 1C) is able to exit the oxidant feed tube 14, reverse direction, and flow in the cavity 28 between the oxidant feed tube 14 and the oxidant electrode 24. It should be noted that other arrangements may be used while remaining within the scope of the present invention. For example, the oxidant feed tube 14 may include a closed end with one or more ports in its walls to allow oxidant flow.

To prevent lateral vibration of the oxidant feed tube 14, a porous washer 27 (for example, a short sleeve of Zirconia felt material) may be installed inside the cavity 28 formed between the SOFC 13 and the oxidant feed tube 14. In one embodiment, the outer surface of the washer 27 bonds to the oxidant electrode 24 during manufacturing and/or operation. A hole in the center of the washer 27 accommodates and holds the oxidant feed tube 14. The porosity of the felt material (e.g., >90%) provides minimal resistance to the flow of the oxidant within the cavity 28. Other techniques for preventing lateral vibration between the oxidant feed tube 14 and/or the SOFC 13 may also be used while remaining within the scope of the present invention. Additionally, the oxidant feed tubes 14 may be made of a ceramic material having thermal expansion qualities similar to that of the SOFCs 13 to maintain the clearance between the oxidant feed tube 14 and the closed end of the SOFC 13 during thermal expansion.

Oxidant is supplied to the oxidant feed tubes 14 via the EAB 18. The EAB 18 may include a horizontal flat plate 18a having individual seats (not shown) for carrying each of the oxidant feed tubes 14. To ensure a tight fitting seal and prevent undesirable movement, each oxidant feed tube 14 may be fitted into the individual seats and bonded to the EAB flat plate 18a with ceramic paste. During sintering and/or initial operation, the ceramic paste cures to bond the oxidant feed tube 14 to the EAB flat plate 18a and maintain the seal.

The fuel supply system may include the fuel feed tube assemblies 16 and the fuel box 19. The fuel reformation system may include a partial reformer and a final reformer. In the current embodiment, the fuel feed tube assemblies 16 may be considered as a part of both the fuel supply system and the fuel reformation system. Fuel may be distributed by associating one or more SOFCs 13 with each fuel feed tube 16.

It should be noted that the EAB 18 may serve multiple roles as part of the oxidant distribution system, the support structure, and the exhaust plenum. Likewise, the fuel box 19 may serve a dual role as part of both the fuel feed supply system and the support structure.

Figure 2A:
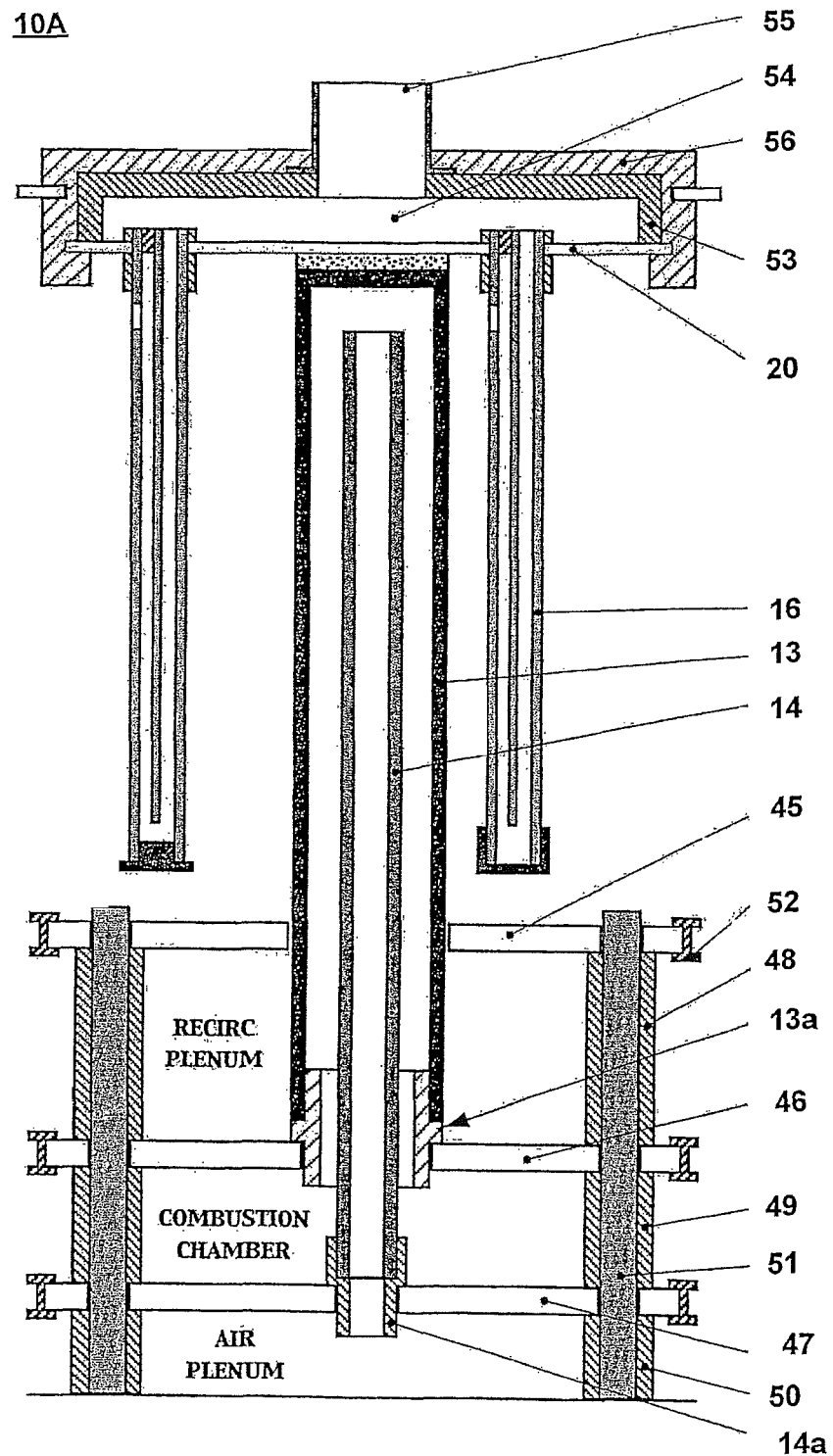
FIG. 2A is a simplified view of an arrangement of a portion of a multi-function bundle according to another embodiment.

FIG. 2A illustrates a simplified arrangement of a single SOFC 13 of a multi-function bundle 10A according to another embodiment. As illustrated in FIG. 2A, the support structure of the multi-function bundle 10A is comprised of a plurality of spacer plates (e.g., 20, 45, 46, 47, etc.), supports (e.g., 48, 49, 50, etc.), and a plurality of alignment pins 51. For simplicity, a single SOFC 13 with an associated oxidant feed tube 14 is shown located between two fuel feed tube assemblies 16, however, it should be apparent to one skilled in the art that the number of SOFCs 13 and fuel feed tube assemblies 16 may be altered while remaining within the scope of the present invention. The SOFC 13 passes through an upper cell spacer plate 45 and is carried by a cell extender 13b which is carried by a lower cell spacer plate 46. The oxidant feed tube 14 is carried by an oxidant feed tube extender 14a which is carried by an air tube spacer plate 47.

The air tube spacer plate 47 is supported by a plurality of air chamber supports 50. The air tube spacer plate 47 and air chamber supports 50 define an air plenum. The lower cell spacer plate 46 is supported by a plurality of combustion chamber supports 49. The lower cell spacer plate 46, combustion chamber supports 49, and the air tube spacer plate 47 define a combustion chamber. The upper cell spacer plate 45 is carried by a plurality of recirc chamber supports 48. The upper cell spacer plate 45, recirc chamber supports 48, and the lower cell spacer plate 46 define a recirc plenum. The placement of the air chamber supports 50, combustion chamber supports 49 and recirc chamber supports 48 is set using alignment pins 51. A plurality of seal locator strips 52 may be used to connect adjacent multifunction bundles 10A. In one embodiment, the seal locator strip 52 has an "H" cross-section that allows it to mate with the edge of the spacer plate 45.

The fuel feed tube assembly 16 passes through a CFF spacer 20 into the active region 32. The fuel feed tube assembly 16 receives fuel from a fuel manifold 54 defined by a reformer box 53 and the CFF spacer 20, among others. Fuel is supplied to the fuel manifold 54 by a fuel manifold entrance port 55. In the current embodiment, the reformer box 53 is nickel impregnated to aid fuel reformation.

The closed end of the SOFC 13 with an oxidant feed tube 14 inserted therein is similar to that as shown in FIG. 1C. Oxidant is supplied to the oxidant feed tubes 14 via the air plenum. As discussed above in conjunction with FIG. 2A, each oxidant feed tube 14 may be fitted to an oxidant feed tube extender 14a (further shown in FIG. 2B) which is carried by air tube spacer plate 47. Alternatively, the air tube spacer plate 47 may include individual seats (not shown) for carrying each of the oxidant feed tubes 14 thus eliminating the need for oxidant feed tube extenders 14a. To ensure a tight fitting seal and prevent undesirable movement, each oxidant feed tube 14 may be fitted into the individual seats and bonded to the air tube spacer plate 47 with ceramic paste. During sintering and/or initial operation, the ceramic paste cures to bond the oxidant feed tube 14 to the air tube spacer plate 47 and maintain the seal.

Figure 2B:
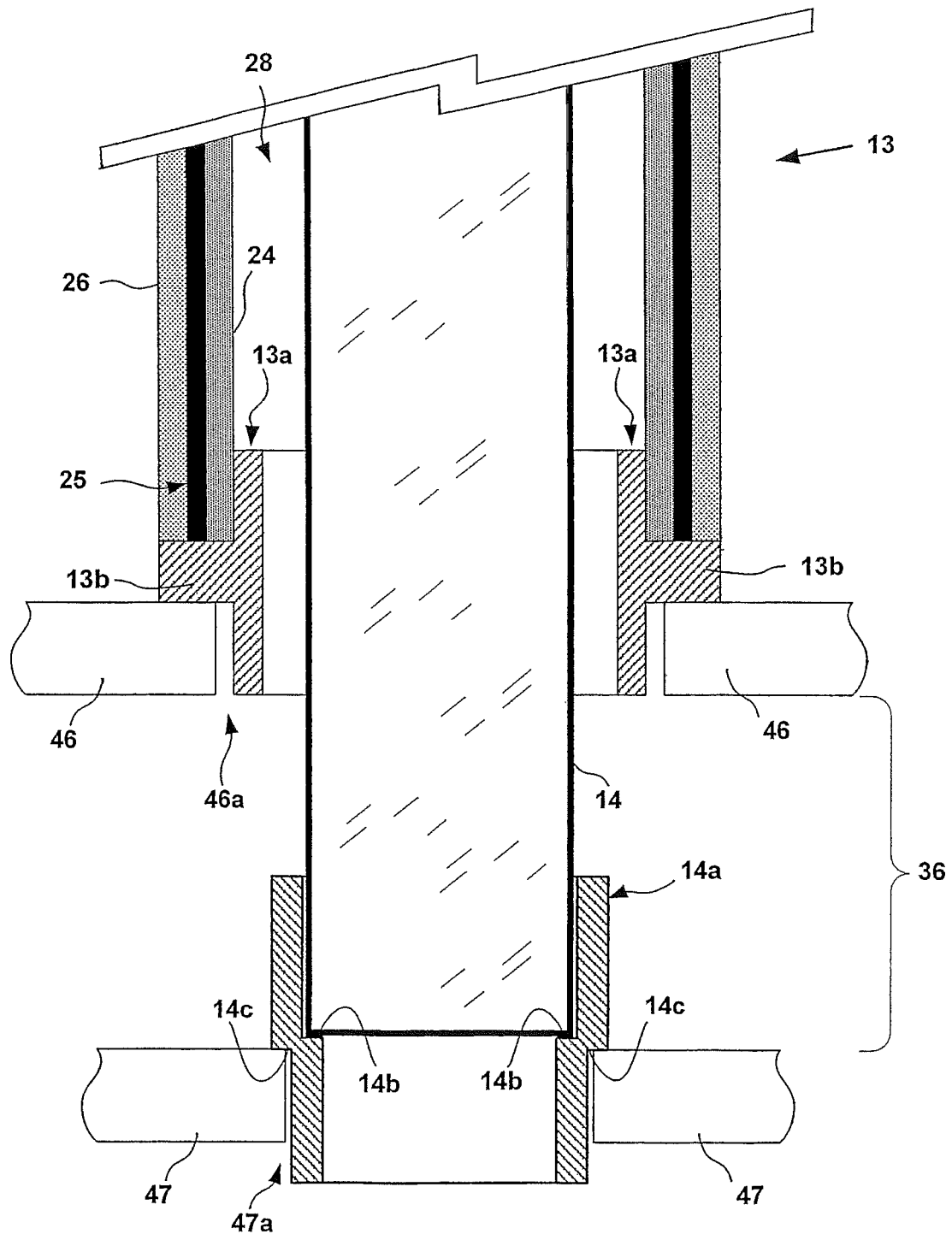
FIG. 2B is a detailed view of the open end of the single SOFC of FIG. 2A with its cell extender attached and its associated oxidant feed tube inserted therein.

FIG. 2B is a detailed view of the open end of the SOFC 13 with the cell extender 13a attached and the associated oxidant feed tube 14 inserted therein as illustrated in FIG. 2A. In the current embodiment, cell extender 13a is a hollow collar through which the oxidant feed tube 14 passes. The cell extender 13a has a shoulder 13b located on its outside diameter, the top of which carries the SOFC 13 and the bottom of which rests on the lower cell spacer plate 46. In addition to carrying the SOFC 13, the shoulder 13b provides a seal that prevents oxidant and fuel from reacting at the open end of the SOFC 13.

The outer diameter of the cell extender 13a (excluding the shoulder 13b) may be less than the diameter of the lower cell spacer plate clearance holes 46a. Thus, the bottom portion of the cell extender 13a may fit within the inner diameter of the lower cell spacer plate clearance hole 46a. Accordingly, the alignment of the SOFC 13 can be adjusted as needed and movement caused by shock and/or thermal expansion can be accommodated. In the current embodiment, the inner diameter of the cell extender 13a is greater than the outer diameter of the oxidant feed tube 14 such that oxidant may flow from the cavity 28 into the combustion zone 36.

As shown in FIG. 2B, the oxidant feed tube 14 may be carried by an oxidant feed tube extender 14a. In the current embodiment, the oxidant feed tube extender 14a is a hollow collar to allow oxidant to flow into the oxidant feed tube 14. The oxidant feed tube extender 14a has an inner shoulder 14b for carrying the oxidant feed tube 14 and an outer shoulder 14c which rests on the air tube spacer plate 47. In addition to carrying the oxidant feed tube 14, the oxidant feed tube extender 14a provides a seal that prevents leakage through the air tube spacer plate clearance holes 47a.

The outer diameter of the lower portion of the oxidant feed tube extender 14a (e.g., below the shoulder 14c) may be less than the diameter of the air tube spacer plate clearance holes 47a. Thus, the bottom portion of the oxidant feed tube extender 14a may fit within the inner diameter of the air tube spacer plate clearance hole 47a. Accordingly, the alignment of the oxidant feed tube 14 can be adjusted as needed during manufacturing assembly.

As briefly discussed above, the multi-function bundle 10 may have a fully distributed final fuel reformation system. For example, final fuel reformation may be distributed by a plurality of fuel feed tube assemblies 16 which are inserted between and around the SOFCs 13. Partially reformed (i.e., methane-rich) fuel may be supplied to the feed tube assemblies 16 by a manifold 54 contained within the fuel box 19 according to one embodiment.

Figure 3A:
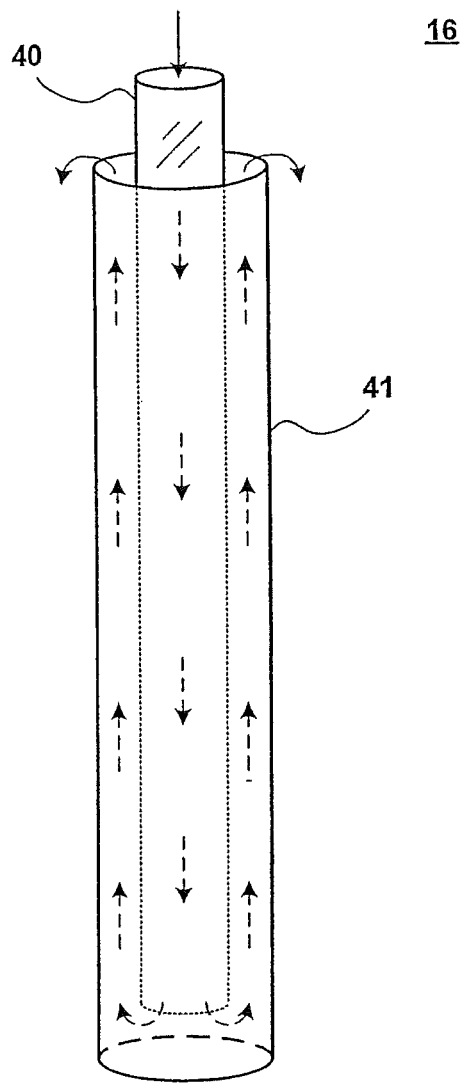
FIG. 3A is a perspective view of a fuel feed tube assembly of the multi-function bundle of FIG. 1A according to one embodiment.
Figure 3B:
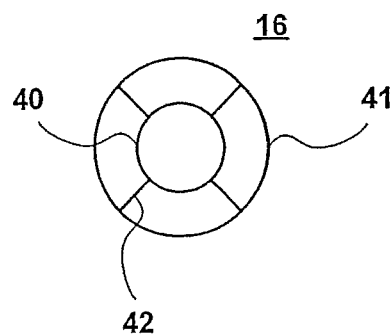
FIG. 3B is a top end view of the fuel feed tube assembly of FIG. 3A according to one embodiment.

FIGS. 3A and 3B are perspective and end views, respectively, of a fuel feed tube assembly 16 for the multi-function bundle 10 of FIG. 1A according to one embodiment. The fuel feed tube assembly 16 includes a fuel feed tube entrance leg 40, a return leg 41, and (as best seen in FIG. 3B) one or more support fins 42. As best shown in FIG. 3A, the fuel feed entrance leg 40 may be longer that the fuel feed return leg 41 to accommodate connection to the fuel supply system.

Figure 5A:
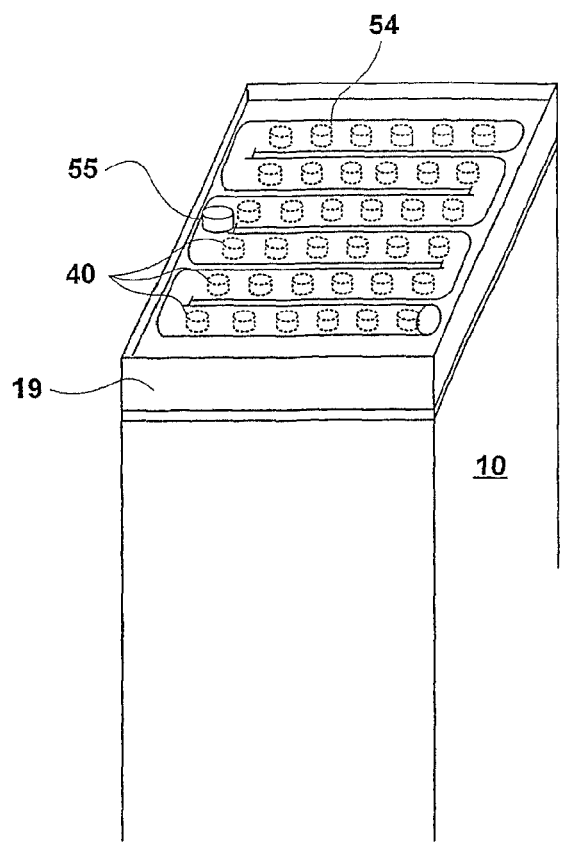
FIGS. 5A-5C are perspective views of a portion of the fuel distribution system for one or more multi-function bundles according to one embodiment.

The flow of fuel within the fuel feed tube assembly 16 is best illustrated in FIG. 3A. Fuel is supplied to the entrance leg 40 (for example, from a fuel supply manifold 54 as shown in FIG. 5A) and flows within the entrance leg 40 towards the closed end of the fuel feed tube assembly 16. At the closed end, the fuel exits the entrance leg 40, reverses direction, and flows in the cavity formed between the outside of the entrance leg 40 and the inside of the return leg 41. The fuel exits the cavity between the entrance leg 40 and the return leg 41 at the open end, opposite the closed end of the fuel feed tube assembly 16.

In one embodiment, final fuel reformation occurs inside the fuel feed tube assemblies 16. Thus, partially reformed fuel supplied to the entrance leg 40 exits as fully reformed fuel from the open end of the return leg 41. To aid the reformation process, one or more components of the fuel feed tube assembly 16 may be made from, or coated with, a catalyst material. For example, the surfaces of the entrance leg 40, return leg 41, and the fins 42 may be flash coated with nickel. It should be noted that other catalysts may be used while remaining within the scope of the present invention. The catalyst choice will depend upon, in part, the fuel to be reformed.

Support fins 42 may insure that the cavity between the outside of the entrance leg 40 and inside of the return leg 41 remains open to allow fuel flow, may enhance the physical strength of the fuel feed assembly 16, may aid in reformation (as discussed above), and may facilitate the transfer of heat between the entrance leg 40 and the return leg 41, among others. As shown in FIG. 3B, the fuel feed tube assembly has four fins spaced to form four flow paths within the cavity between the outside of the entrance leg 40 and inside of the return leg 41. The number of fins 42 used, and their relative positioning within the fuel feed tube assembly 16, may be altered while remaining within the scope of the present invention. The length of the fins 42 relative to the axis of the entrance leg 40 and return leg 41 may be varied while remaining within the scope of the present invention.

The fuel feed tube assembly 16 may function as a counter-flow heat exchanger which improves the thermal distribution within the multi-function bundle 10. For example, the fuel feed tube assembly 16 may help reduce the localized cooling impact that the fuel reformation process has on the operation of the array of fuel cells 13.

In one embodiment, the fuel feed tube assembly 16 may be extruded as an integrated unit, however, other methods of construction may be used while remaining within the scope of the present invention. For example, the fuel feed entrance leg 40 may be formed as an elongated sleeve having an inlet and an outlet and the fuel feed tube return leg 41 may be formed as an elongated sleeve having an open end and a closed end. The fuel feed tube entrance leg 40 may be nested inside the fuel feed tube return leg 41 to form a fuel flow path similar to that shown in FIG. 3A. The fuel feed tube assembly 16 illustrated in FIGS. 3A and 3B is substantially cylindrical in shape, however, other shapes may be used while remaining within the scope of the present invention. In addition, tube configurations other than concentric flow passages such as adjoined, side-by-side flow passages (as shown in FIGS. 4A and 4B) may be used while remaining within the scope of the present invention.

Figure 4A:
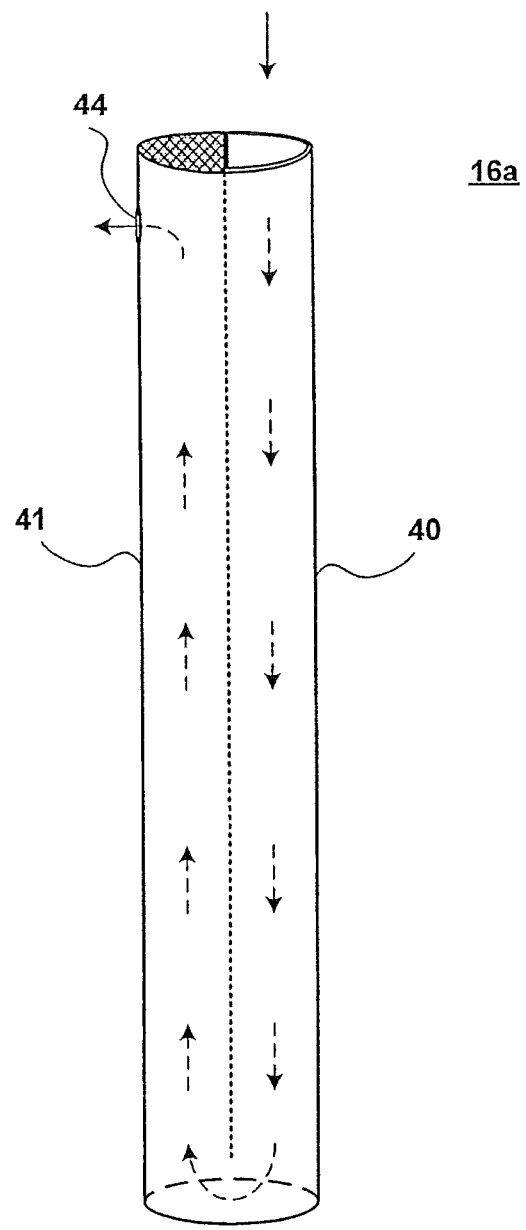
FIG. 4A is a perspective view of a fuel feed tube assembly of the multi-function bundle of FIG. 1A according to one embodiment.
Figure 4B:
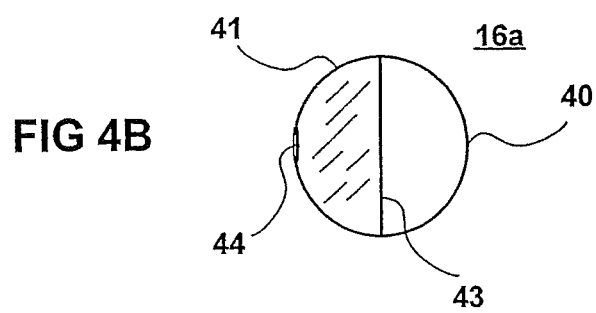
FIG. 4B is a top end view of a fuel feed tube assembly of FIG. 4A according to one embodiment.

FIGS. 4A and 4B are a perspective view and an end view, respectively, of a fuel feed tube assembly 16a for the multi-function bundle 10 of FIG. 1A according to another embodiment. The fuel feed tube assembly 16a includes a fuel feed tube entrance leg 40, a return leg 41, and (as best seen in FIG. 4B) one or more divider/support fins 43. As best shown in FIG. 4A, the fuel feed tube entrance leg 40 may be the same length as the fuel feed tube return leg 41 and the fuel feed tube return leg 41 plugged. In an alternative embodiment, the fuel feed tube entrance leg 40 may be longer than the fuel feed return leg 41 to accommodate connection to the fuel supply system.

The flow of fuel within the fuel feed tube assembly 16a is best illustrated in FIG. 4A. Fuel is supplied to the entrance leg 40 (for example, from one embodiment of a fuel supply manifold 54 as shown in FIG. 5A) and flows within the entrance leg 40 towards the closed end of the fuel feed tube assembly 16a. At the closed end, the fuel exits the entrance leg 40, reverses direction, and flows within the return leg 41. As illustrated in FIG. 4A, the top of the fuel feed return leg 41 may be sealed. Accordingly, the fuel exits the fuel feed tube assembly 16a via one or more fuel feed tube exit ports 44 (e.g., located in the side walls of the fuel feed return leg 41, opposite the closed, bottom end of the fuel feed tube assembly 16a). It should be apparent to one skilled in the art that other designs may be used while remaining within the scope of the present invention, for example, the top of the fuel feed return leg 41 may be open such that the fuel may flow directly out of the top of fuel feed return leg 41.

In one embodiment, final fuel reformation occurs inside the fuel feed tube assemblies 16a. Thus, partially reformed fuel supplied to the entrance leg 40 exits as fully reformed fuel from the fuel exit ports 44. To aid the reformation process, one or more components of the fuel feed tube assembly 16a may be made from, or coated with, a catalyst material. For example, the surfaces of the entrance leg 40, return leg 41, and the divider/support fin 43 may be flash coated with nickel. It should be noted that other catalysts may be used while remaining within the scope of the present invention. The catalyst choice will depend upon, in part, the fuel to be reformed.

In one embodiment, the fuel feed tube assembly 16a may be extruded as an integrated unit, however, other methods of construction may be used while remaining within the scope of the present invention. For example, the fuel feed entrance leg 40 and fuel feed return leg 41 may be constructed separately and then combined to from the fuel feed tube assembly 16a. As shown, the fuel feed entrance leg 40 and fuel feed return leg 41 are substantially "D-shaped," such that when combined, the fuel feed tube assembly 16a illustrated in FIGS. 4A and 4B is substantially cylindrical in shape. However, other shapes may be used while remaining within the scope of the present invention.

Figure 5B:
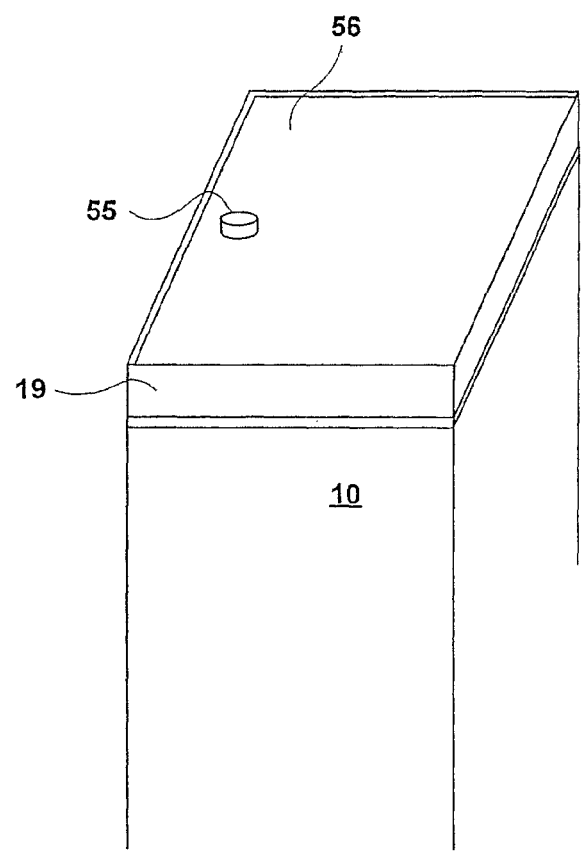

FIGS. 5A-5B are perspective views of the fuel distribution system for the multi-function bundle 10 according to one embodiment. Referring to FIG. 5A, the fuel feed tube entrance legs 40 for each fuel feed tube assembly 16, 16a passes through clearance holes in the bottom of the fuel box 19. The fuel feed tube entrance legs 40 are contained within a space defined by the fuel box 19 bottom and side walls. A thin layer of cast insulation material may be used to hold the fuel feed tube entrance legs 40 in place relative to bottom of the fuel box 19 and may also provide a seal around the entrance legs 40 relative to the clearance holes in the bottom of the fuel box 19.

A fuel manifold 54 is placed over and connects each of the fuel feed tube entrance legs 40. The fuel manifold 54 may be made from thin-walled tubing. For example, thin-walled nickel tubing may be used to connect the fuel feed tube entrance legs 40 and to enhance the fuel reformation process. The walls of the tubing may be very thin (e.g., approximately 1/64 in. thick) to allow the serpentine path of the fuel manifold 54 to be easily formed. The serpentine path helps to reduce the forces caused by thermal expansion differences between the metal and ceramic materials. It should be apparent to one skilled in the art that other designs may be used while remaining within the scope of the present invention.

Each fuel manifold 54 may include an associated fuel manifold entrance port 55. In one embodiment, the fuel manifold entrance port 55 extends past the top of the fuel box's 19 side walls.

Referring to FIG. SB, after the fuel manifold 54 is placed over the projecting ends of the fuel feed tube entrance legs 40, the fuel feed assembly may be cast in a cement-like insulation material 56. The cast insulation material 56 occupies the space defined by the fuel box's 19 bottom and side walls. The cast insulation material 56 provides support to the multi-function bundle 10 and provides a seal between the manifold 54 and the fuel feed entrance legs 40. In one embodiment, a ceramic cast insulation 56 is used. The ceramic cast insulation 56 may be applied to a level flush with the top of the fuel box's 19 side walls such that only the fuel manifold entrance port 55 remains exposed. In one embodiment, the ceramic cast insulation may form the sides of the fuel box 19.

Figure 5C:
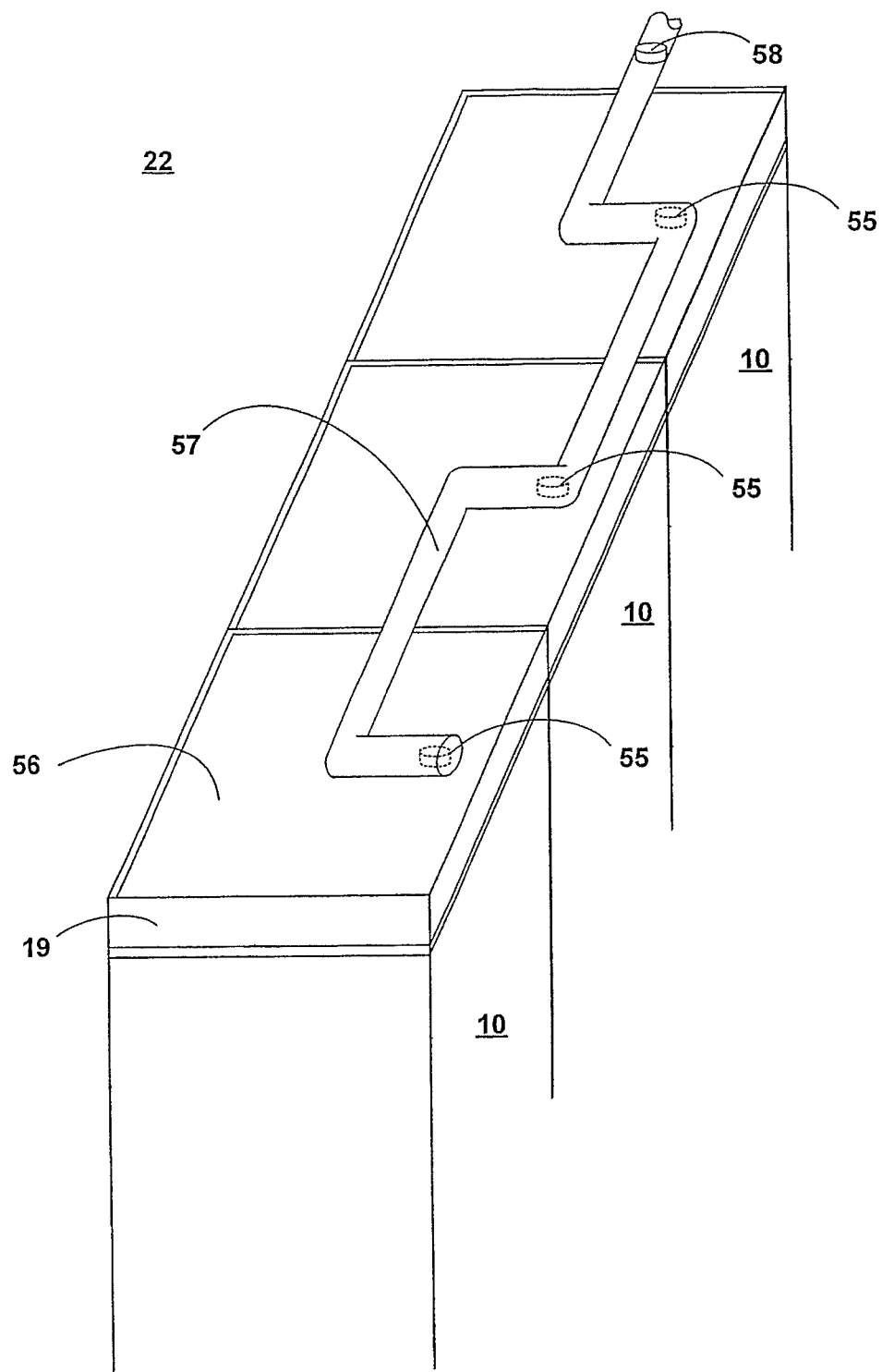

FIG. 5C is a perspective view of three multi-functional bundles 10 joined together in a stack 22. After the cast ceramic insulation 56 is applied, a row header 57 may be placed over the fuel manifold entrance ports 55 of each multi-function bundle 10. Each row header 57 may have an associated row header entrance port 58 for connecting the fuel distribution system to a fuel supply and/or to a recirculation system. In one embodiment, the row header 57 is made from a thin piece of nickel tubing (e.g., to aid in the reformation process) bent in a serpentine pattern (e.g., to accommodate thermal expansion). It should be noted that other designs for the fuel distribution system may be used while remaining within the scope of the present invention.

In one embodiment, the fuel feed tube assemblies 16, 16a may be omitted from the multi-function bundle 10. For example, the fuel manifold 54 and/or row header 57 may be made from, or coated with, a catalyst material to enhance fuel reformation within the manifold 54 and/or row header 57. After reformation, the fuel may be distributed directly from the fuel manifold 54 to the SOFCs 13 through the holes in the fuel box 19. Fuel that does not require reformation may also be supplied directly to the SOFCs 13 thus eliminating the need to have a catalyst material present in the fuel manifold 54 and/or row header 57.

When the multi-function bundles 10 are placed in a stack 22 (i.e., are stacked next to each other) the edges of the EAB 18, the recirculation box 17, and the fuel box 19 of a first multi-function bundle 10 contact (and transfer side loads to) the EAB 18, the recirculation box 17, and fuel box 19, respectively, of adjacent multi-function bundles 10. In one embodiment, the EAB 18, the recirculation box 17, and fuel box 19 include tongue-and-groove fits (not shown). The tongue-and groove-fits ensure the relative location of adjacent bundles and enhance the zone-to-zone sealing capability. The tongue-and-groove fits allow the stack 22 to endure large loads (such as those encountered during shock loading), without significant and potentially damaging relative movement. Large relative movement normal to the axis of the tongue-and-groove is prevented.

The tongue-and-groove fits of the EABs 18 may also form a partial gas seal between adjacent multi-function bundles 10. Although the tongue-and-groove seals may include gaps resulting from assembly and manufacturing imperfections, they provide a seal that is more effective than the conventional controlled leakage seals formed by the clearance between SOFCs 13 and the feed through holes in porous spacer boards.

It should be noted that the edges of the recirculation boxes 17 may also form a partial gas seal and provide side load support when two or more multi-function bundles 10 are combined to form a stack 22. However, the edge dimensions and tolerances of the boxes may be designed to ensure that the EABs 18 provide the predominant side load support (for the lower end of the bundle 10).

Figure 6A:
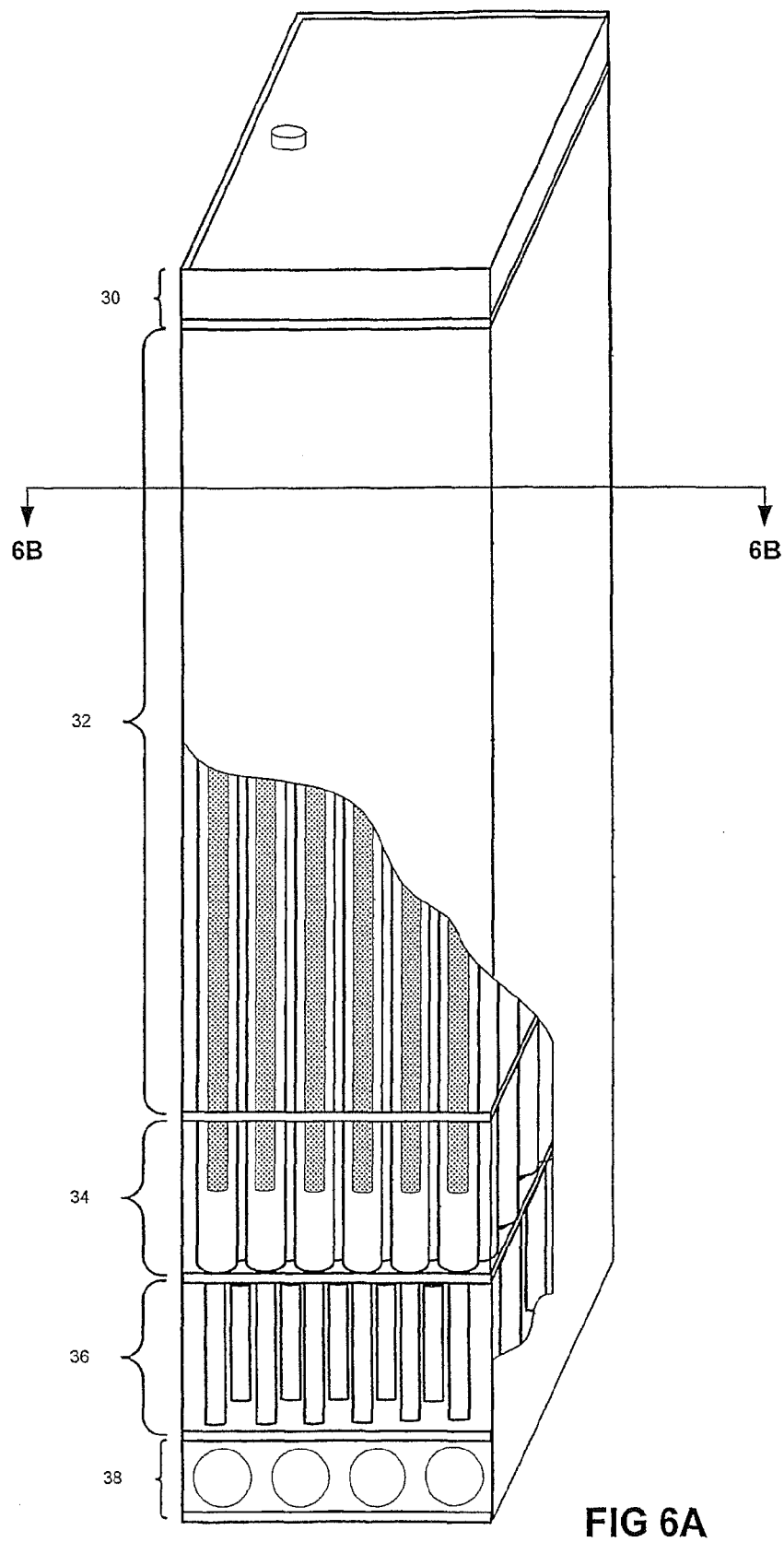
FIG. 6A is a perspective view of a multi-function bundle of FIG. 1A illustrating the different process zones according to one embodiment.

FIG. 6A is a perspective view of the multi-function bundle of FIG. 1A illustrating the different process zones according to one embodiment. For example, fuel distribution zone 30 refers to the region in which the fuel is provided for supply to the fuel cells 13 (for example through fuel feed tube assemblies 16 shown in FIG. 1A). The active zone 32 refers to the region in which the fuel and oxidant combine in an electrochemical reaction. The recirculation zone 34 refers to the region in which a portion of the depleted exit fuel mixture is extracted and used, for example, by an external partial reformer before being sent back as partially reformed, methane-rich fuel to the fuel distribution zone 30. The combustion zone 36 refers to the region in which the portion of the fuel mixture remaining after the recirculation zone 34 is combusted with oxidant entering the combustion zone from the open ends of the SOFCs 13. The oxidant (air) distribution zone 38 refers to the zone in which oxidant is supplied to the oxidant feed tubes 14, for example, via the EAB 18.

FIG. 6B illustrates a cut-away end view along line 6B-6B of the multi-function bundle 10 with the fuel feed tube assemblies 16 inserted according to one embodiment. The fuel feed tube assemblies 16 are located between and around the SOFCs 13. Flexible electrical connectors 15 may be used to connect the SOFCs 13. For example, a flexible electrical connector 15 may be used to connect the fuel electrode 26 of one SOFC 13 to the fuel electrode 25, or to the cell electrical interconnect 23, of another SOFC 13. Flexible electrical connectors 15 may be made, for example, from a single piece of conductive material (e.g., nickel sheet).

The distribution of fuel feed tube assemblies 16 among the SOFCs 13 allows the fuel reformation process to occur in close proximity to the electrochemical reaction heat source. Thus, parasitic heat loss is greatly reduced. As the fuel mixture passes through the fuel feed tubes assemblies 16, it absorbs heat from the electrochemical cell reaction and is reformed into a hydrogen-rich fuel mixture.

Returning briefly to FIG. 6A, the basic operation of the multi-function bundle 10 will be discussed. Oxidant is fed to the oxidant feed tubes 14 (located within the SOFCs 13) by the EAB 18. The oxidant enters the oxidant feed tubes 14 and flows the length of the active region 32 (i.e., towards the fuel distribution zone 30), exits the oxidant feed tubes 14, reverses direction, and flows inside the cavity 28 between the outer surface of the oxidant feed tube 14 and the inner surface the SOFCs 13 (i.e., towards the recirculation zone 34).

At the same time that oxidant is being fed to the oxidant feed tubes 14, fuel is fed to the outside surface of the SOFCs 13. In one embodiment, a methane rich, partially reformed fuel is distributed to the fuel feed tube assemblies 16 via the fuel manifolds 54. The partially reformed fuel enters the inside of the fuel feed tube entrance leg 40 (i.e., in the fuel distribution zone 30) and flows the length of the active region 32 (i.e., towards the recirculation zone 34). The fuel exits the inside of the fuel feed tube entrance leg 40, reverses direction, and flows back along the length of the active region 32 (i.e., towards the fuel distribution zone 30) and exits the inside of the fuel feed tube return leg 41.

As the fuel mixture passes through the fuel feed tube assemblies 16, it absorbs heat from the electrochemical cell reaction and is fully reformed into a hydrogen-rich fuel mixture. The fuel feed tube assemblies 16 allow the final reformation to occur in close proximity to the electrochemical reaction heat source. Accordingly, heat loss is eliminated for the fuel feed tube assemblies 16 that are surrounded by cells and minimized (through the use of thermal insulation) for the fuel feed tube assemblies 16 exposed to the periphery. As a result essentially all of the heat supplied to reform the fuel inside the bundle 10 is available to the cell's electrochemical reaction.

The fully reformed fuel exits the fuel feed tube assemblies 16 in the active zone 32 near the fuel distribution zone 30. The fully reformed fuel then reverses direction in the active zone and flows (i.e., towards the recirculation zone 34) along the outside of the SOFCs where it electrochemically reacts with oxygen ions that move through the solid electrolyte 25 as a result of the oxidant flowing within the cavity 28. In one embodiment, approximately 75 to 85% of the available fuel is used in the electrochemical reaction.

A depleted fuel mixture arrives at the exit of active zone 32 (i.e., next to the recirculation zone 34). The depleted fuel mixture contains un-reacted fuel and reaction products (for example, a significant amount of water) that may be used to initiate the partial fuel reformation. The depleted fuel mixture passes from the active zone 32, through a set of controlled leakage seals (not shown), and into the recirculation zone 34. In one embodiment, a portion of the depleted fuel mixture is extracted from the recirculation zone 34, fed to an external partial reformer (not shown) via a re-circulated fuel loop and re-supplied as partially reformed methane-rich fuel to the fuel distribution zone 30.

In the external partial reformer, raw liquid fuel (such as diesel, kerosene, JP-8, etc.) is vaporized and added to the depleted fuel mixture which contains water vapor to enable steam reformation to occur. After adding vaporized raw fuel, the fuel mixture passes through a catalyst bed where the fuel mixture is partially reformed to become a methane-rich fuel mixture. A fan or blower may be used to overcome the small pressure drop through the external partial reformer and pump the partially reformed, methane-rich fuel mixture back to the fuel distribution zone 30.

The remaining portion of the depleted fuel mixture passes from the recirculation zone 34, through a lower set of controlled leakage seals (not shown), and into the combustion zone 36. Combustion occurs immediately as the fuel mixture combines with depleted oxidant entering the combustion zone 36 from the open ends of the SOFCs 13.

It should be noted that some of the heat produced in the combustion zone 36 may be absorbed by the oxidant within the oxidant feed tubes 14 which pass through the combustion zone 36. Thus, heat that would otherwise be lost from within the combustion zone 36 may be re-captured. Additionally, the oxidant distribution system may be used to cool the multi-function bundle 10 (i.e., to keep the bundle 10 at the desired operating temperature). The total height (fuel distribution zone 30, active region 32, recirculation zone 34, combustion zone 36, and air distribution zone 38) may be fixed for a particular engine. The ratio between the height of the active region 32 and the height of the combustion zone 36 may be used to establish the maximum power for the engine volume. Unlike typical heat engine practices, the multi-function bundle 10 does not utilize a recouperator to capture excess heat from the exhaust stream (i.e., after the exhaust has left the combustion zone 36) to pre-heat the incoming oxidant because doing so would require larger air flow passages to accommodate the low density air from the recouperator and thereby make the engine larger to accommodate the larger flow passages.

Figure 13:
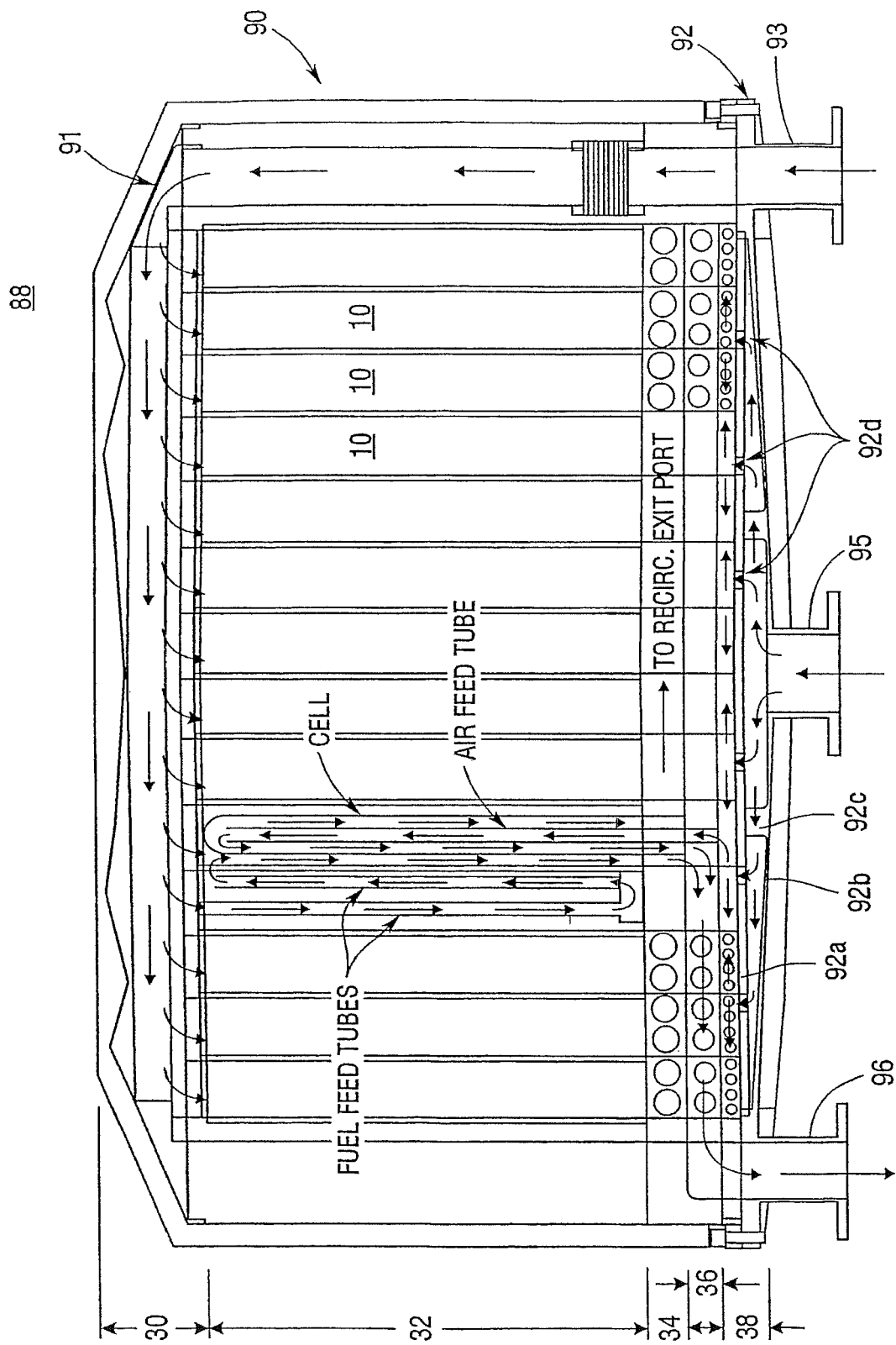
FIG. 13 is a cut-away side view of a fuel cell engine according to one embodiment.

In one embodiment, when two or more multi-function bundles 10 are aligned next to each other, the large circular holes in the sides of the recirculation box 17 and the EAB 18 allow the gas mixtures to flow laterally through the adjacent bundles 10. Thus, three separate flow channels are formed by the recirculation box 17 and the EAB 18 when the bundles 10 are aligned together. The upper channel (i.e., the recirculation channel) may be connected to a re-circulated fuel loop via a side port 107 (e.g., as shown in FIG. 15). The intermediate channel (i.e., the exhaust channel) may be connected to a module exhaust line via a side port similar to side port 107 but located on the opposite side of the module and at the appropriate height to accommodate the combustion zone. Similarly, other large circular holes in the lower sides of the EAB 18 allow the oxidant to flow laterally through adjacent bundles 10 resulting in a flow channel when the bundles 10 are aligned together. This flow channel may be connected to oxidant supply holes (e.g., as shown in FIG. 13). In another embodiment (for example, the arrangement shown in FIG. 2A), there are no sides; the plates are separated by pin and support arrangements.

Figure 7B:
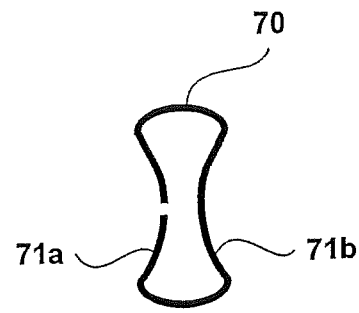
FIG. 7B is an end view of the cell-to-cell electrical connector of FIG. 7A according to one embodiment.
Figure 7C:
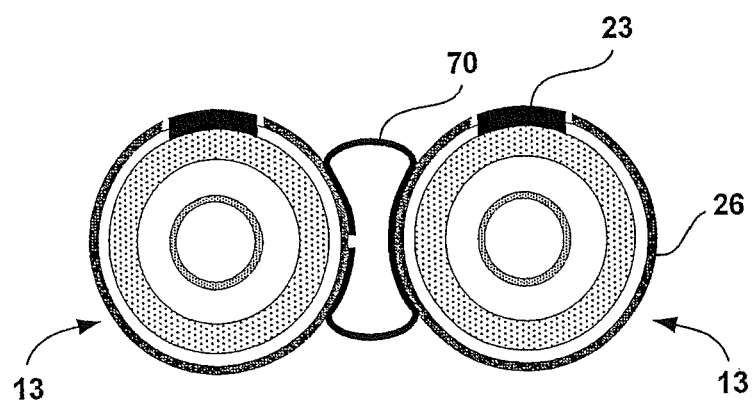
FIG. 7C is an end view of the electrical connector of FIG. 7A between two adjacent SOFCs.

FIGS. 7A and 7B are a perspective view and an end view, respectively, of a cell-to-cell electrical connector 70 according to one embodiment. FIG. 7C is an end view of the electrical connector 70 between two adjacent SOFCs 13. Electrical connector 70 is substantially shaped as an elongated oval (ovals of Cassini) and is sized to fit between adjacent SOFCs 13 in the multi-function bundle 10. As best seen in FIG. 7C, electrical connector 70 may be designed to electrically connect the fuel electrodes 26 of two adjacent SOFCs 13 or to connect the fuel electrode 26 and the electrical interconnect 23 of two adjacent SOFCs 13. To increase the contact area between the electrical connector 70 and the SOFCs 13, two opposing surfaces 71a, 71b of the electrical connector 70 may be shaped to match the outer surface of the SOFC 13.

It should be apparent to those skilled in the art that the shape of the cell-to-cell electrical connector may be altered while remaining within the scope of the present invention. For example, FIG. 7D is a perspective view of a cell-to-cell electrical connector 70 having a bow-tie-shaped cross section.

Figure 8A:
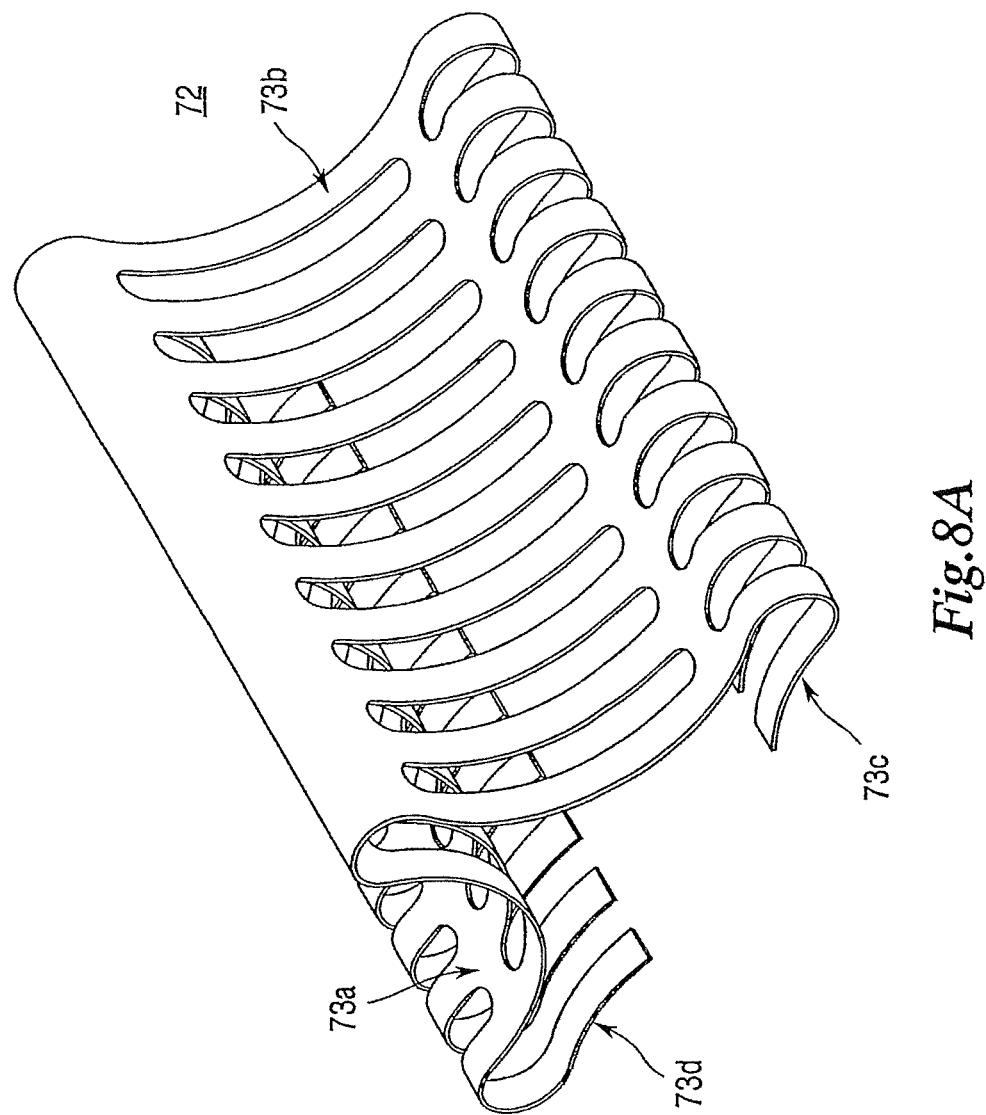
FIG. 8A is a perspective view of a cell-to-cell electrical connector according to another embodiment.
Figure 8B:
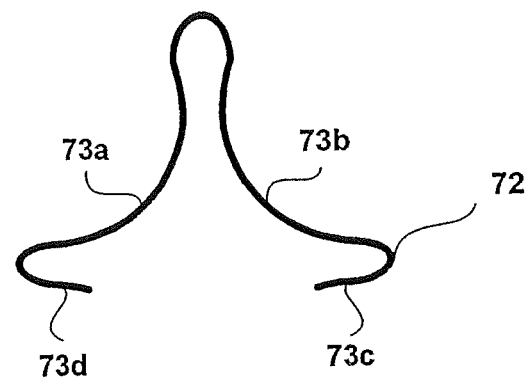
FIG. 8B is an end view of the cell-to-cell electrical connector of FIG. 8A according to one embodiment.
Figure 8C:
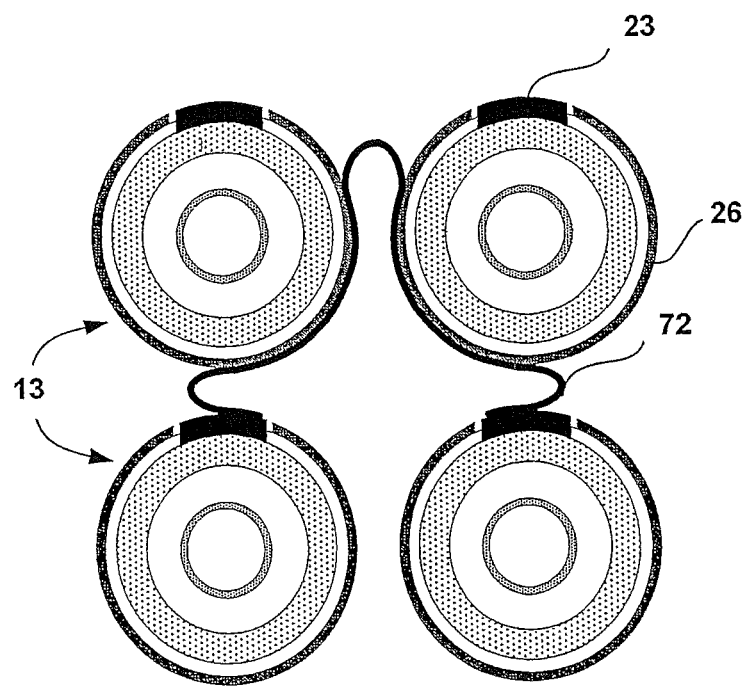
FIG. 8C is an end view of the electrical connector of FIG. 8A between several SOFCs.
Figure 8D:
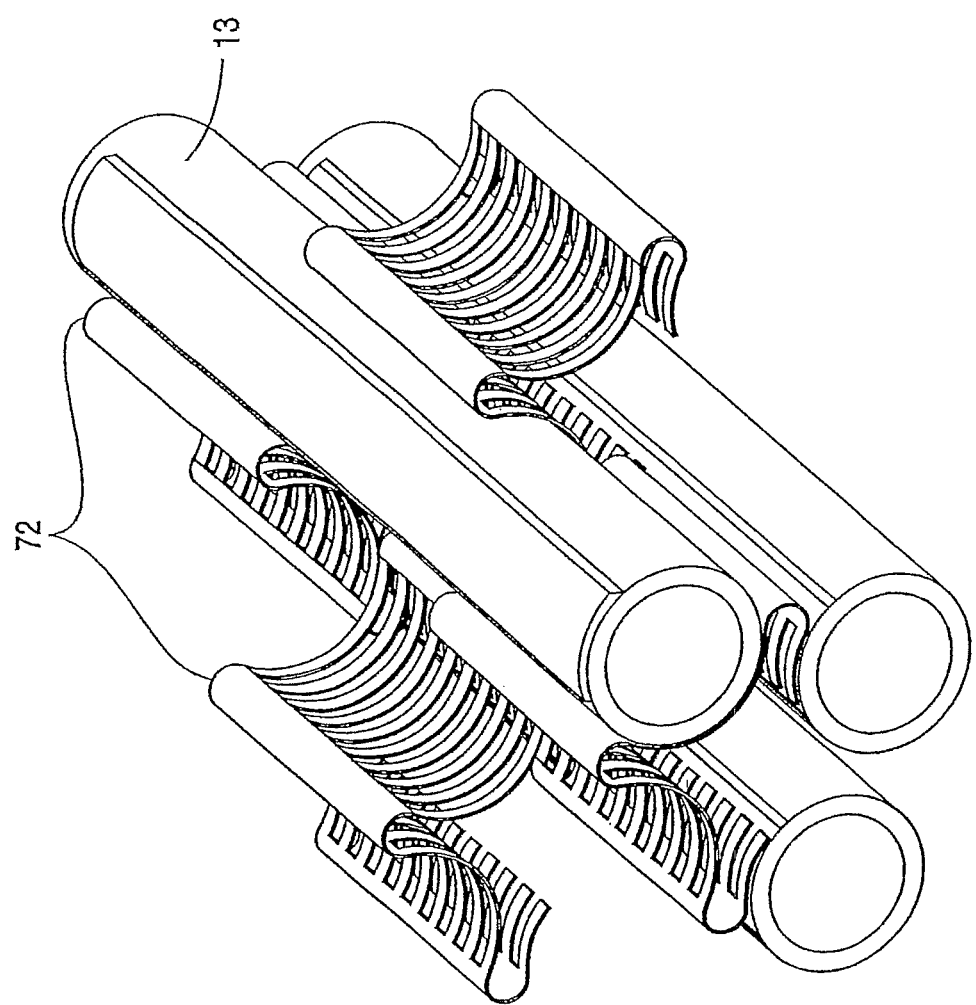
FIG. 8D is a perspective view of a cell-to-cell electrical connector of FIG. 8A between several SOFCs.

FIGS. 8A and 8B are a perspective view and an end view, respectively, of a cell-to-cell electrical connector 72 according to another embodiment. FIGS. 8C and 8D are an end view and a perspective view, respectively, of the electrical connector 72 between several SOFCs 13. Electrical connector 72 is shaped as an elongated series of curves and is sized to fit between adjacent SOFCs 13 in the multi-function bundle 10. As best seen in FIG. 8C, electrical connector 72 is designed to electrically connect the fuel electrodes 26 of two adjacent SOFCs 13 in the same row to each other and to the SOFC cell electrical interconnects 23 of two SOFCs from an adjacent row. To increase the contact area between the electrical connector 73 and the SOFCs 13, surfaces 73a, 73b of the electrical connector 72 may be shaped to match the outer surface of the fuel electrodes 26 and surfaces 73c, 73d may be shaped to match the outer surface of the electrical interconnects 23 of the SOFCs 13.

Figure 9A:
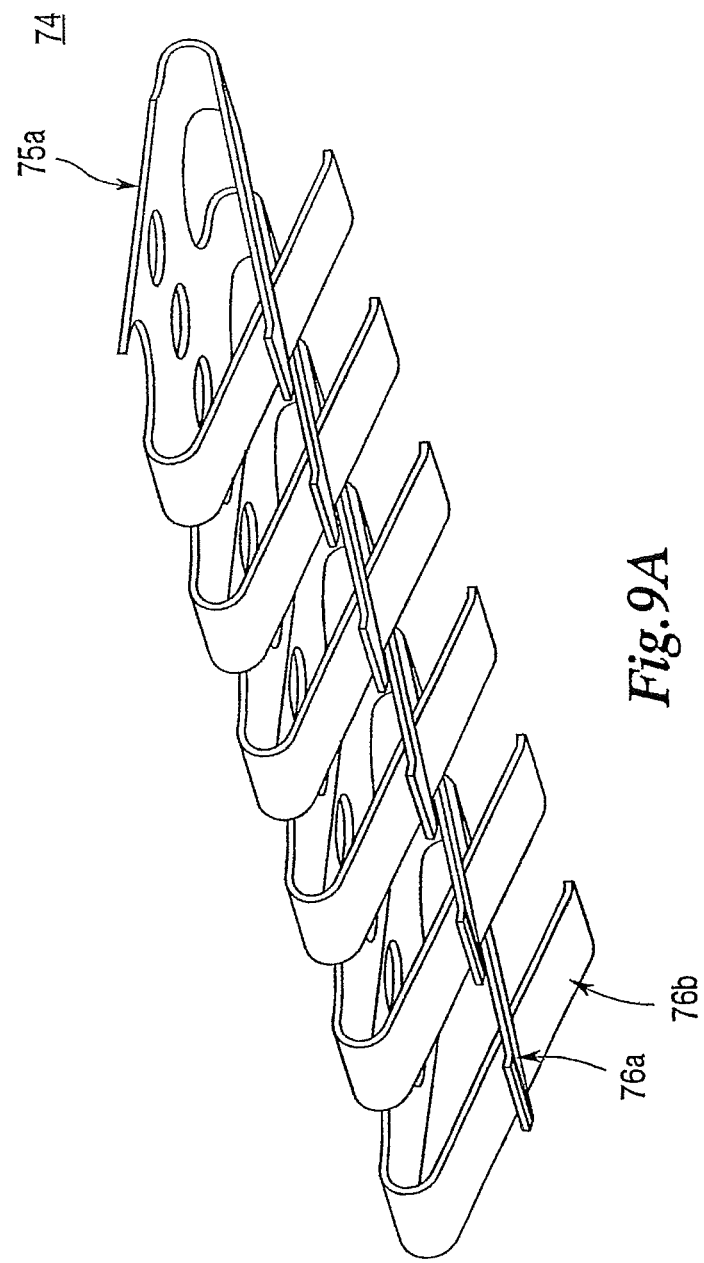
FIG. 9A is a perspective view of a cell-to-cell electrical connector according to another embodiment.
Figure 9B:
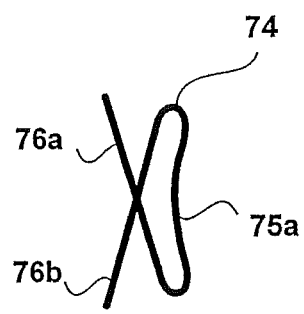
FIG. 9B is an end view of the cell-to-cell electrical connector of FIG. 9A according to one embodiment.
Figure 9C:
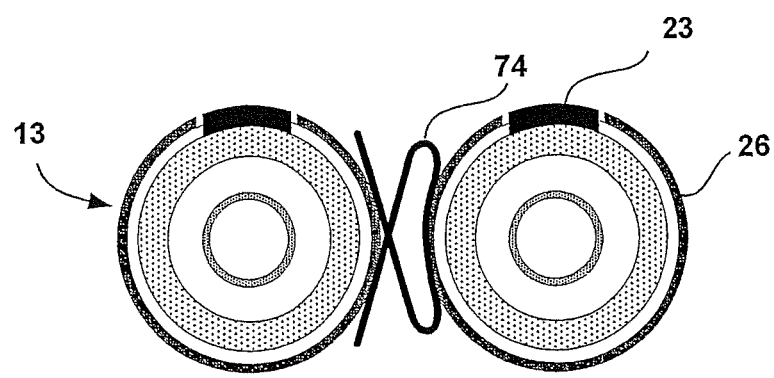
FIG. 9C is an end view of the electrical connector of FIG. 9A between two SOFCs.

FIGS. 9A and 9B are a perspective view and an end view, respectively, of a cell-to-cell electrical connector 74 according to another embodiment. FIG. 9C is an end view of the electrical connector 74 between two SOFCs 13. Electrical connector 74 has a curved back and a series of interleaved fingers 76a; 76b extending from either end. Electrical connector 74 is elongated and is sized to fit between adjacent SOFCs 13 in the multi-function bundle 10. As best seen in FIG. 9C, electrical connector 74 is designed to electrically connect the fuel electrodes of two adjacent SOFCs 13 or to connect the fuel electrode 26 and the electrical interconnect 23 of two adjacent SOFCs 13. To increase the contact area between the electrical connector 74 and the SOFCs 13, the surface 75a may be shaped to match the outer surface of the SOFC 13 and the angle between fingers 76a and 76b may be selected such that an SOFC 13 fits between the fingers 76a, 76b.

Figure 10A:
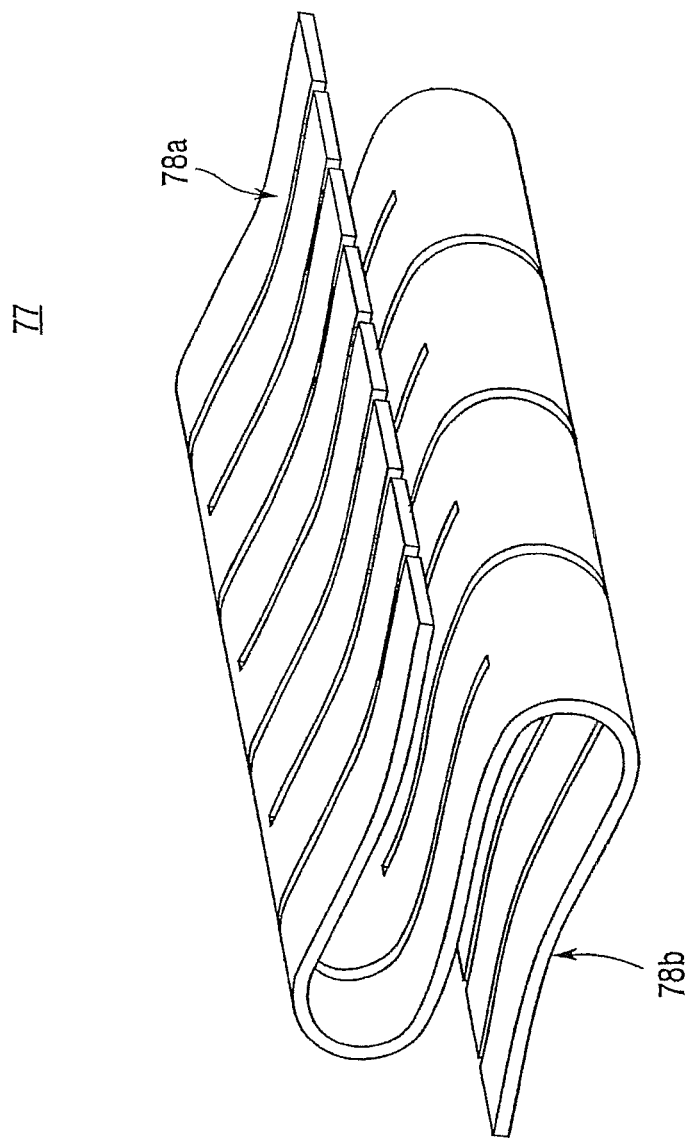
FIG. 10A is a perspective view of a cell-to-cell electrical connector according to another embodiment.
Figure 10B:
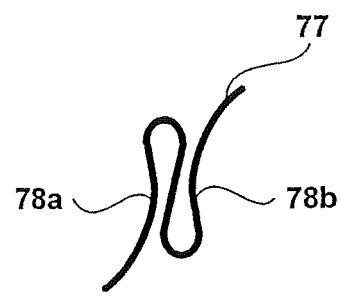
FIG. 10B is an end view of the cell-to-cell electrical connector of FIG. 10A according to one embodiment.
Figure 10C:
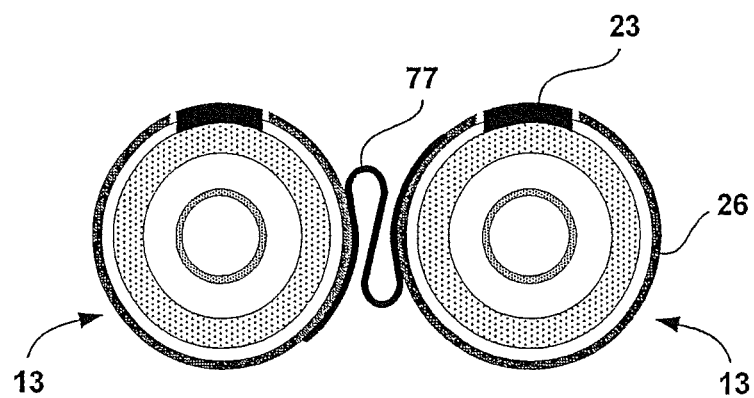
FIG. 10C is an end view of the electrical connector of FIG. 10A between two SOFCs.

FIGS. 10A and 10B are a perspective view and an end view, respectively, of a cell-to-cell electrical connector 77 according to another embodiment. FIG. 10C is an end view of the electrical connector 77 between two SOFCs 13. Electrical connector 77 is an elongated S-shape that is sized to fit between adjacent SOFCs 13 in the multi-function bundle 10. As best seen in FIG. 10C, electrical connector 77 is designed to electrically connect the fuel electrodes 26 of two adjacent SOFCs 13 or to connect the fuel electrode 26 and the electrical interconnect 23 of two adjacent SOFCs 13. To increase the contact area between the electrical connector 77 and the SOFCs 13, the surfaces 78a,78b may be shaped to match the outer surface of the SOFC 13.

Electrical connectors 70, 72, 74, 77 may be manufactured from a single sheet of conductive material (e.g., nickel sheets). Portions of material may be removed from the sheet to reduce weight without adversely affecting the electrical conductivity of the electrical connectors 70, 72, 74, 77. The sheet may then be folded, bent, and/or otherwise manipulated to obtain the desired shape. It should be apparent to one skilled in the art that other methods and materials may be used to manufacture the electrical connectors 70, 72, 74, 77 while remaining within the scope of the present invention.

Figure 11:
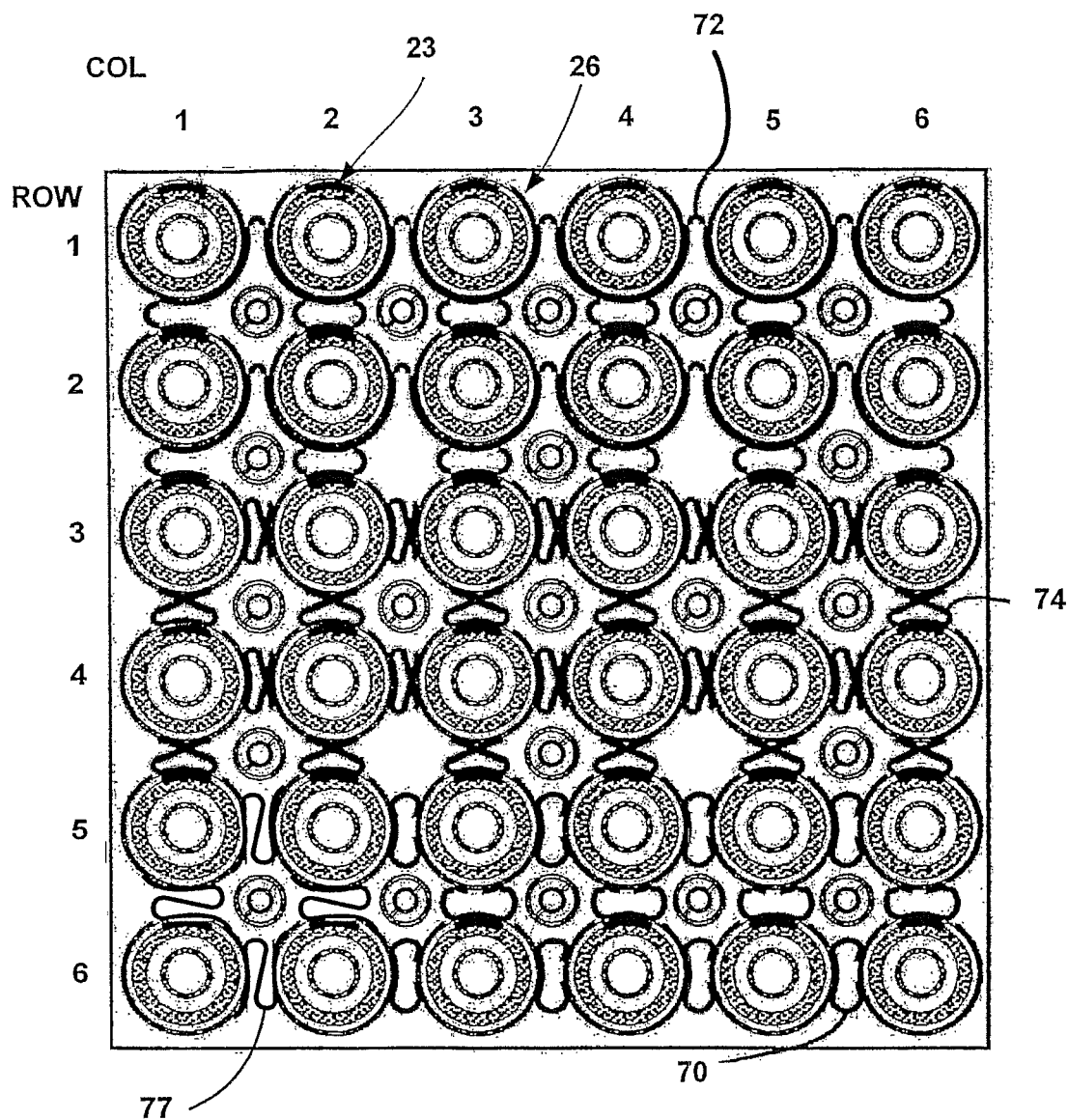
FIG. 11 is the cut-away view of the multi-function bundle of FIG. 1A illustrating cell-to-cell electrical connections according to one embodiment.

FIG. 11 is a cut-away view of the multi-function bundle of FIG. 1A illustrating the electrical connections using cell-to-cell electrical connectors 70, 72, 74, 77 according to one embodiment. For example, as seen in FIG. 11, the fuel electrode 26 of SOFC (1, 3) (i.e., the SOFC in row 1, column 3) may be electrically connected to the fuel electrodes 26 of both SOFC (1, 2) (i.e., its left adjacent neighbor) and SOFC (1, 4) (i.e., its right adjacent neighbor) and to the cell electrical interconnects 23 of SOFCs (2, 2) (2, 3) and (2, 4) (i.e., the SOFCs in row 2, columns 2, 3, and 4, respectively) by alternatingly stacking the electrical connectors 72 (for example, as shown in the arrangement illustrated in FIG. 8D).

Additionally, the electrical interconnect 23 of SOFC (5, 2) is connected to the fuel electrode of SOFC (4, 2) by electrical connector 74, whereas the fuel electrode 26 of SOFC (5, 2) is connected to the fuel electrodes 26 of SOFC (5, 1) and SOFC (5, 3) and to the electrical interconnect 23 of SOFC (6, 2) by electrical connector 70. In addition to electrically connecting the SOFCs 13, the electrical connectors 70, 72, 74, 77 may provide structural support to the SOFCs 13. It should be apparent to one skilled in the art that the number, type(s), and pattern of electrical connectors 70, 72, 74, 77 used to connect cells within the multi-function bundle 10 and to connect two or more multi-function bundles in a stack 22 may be varied while remaining within the scope of the present invention.

Figure 12:
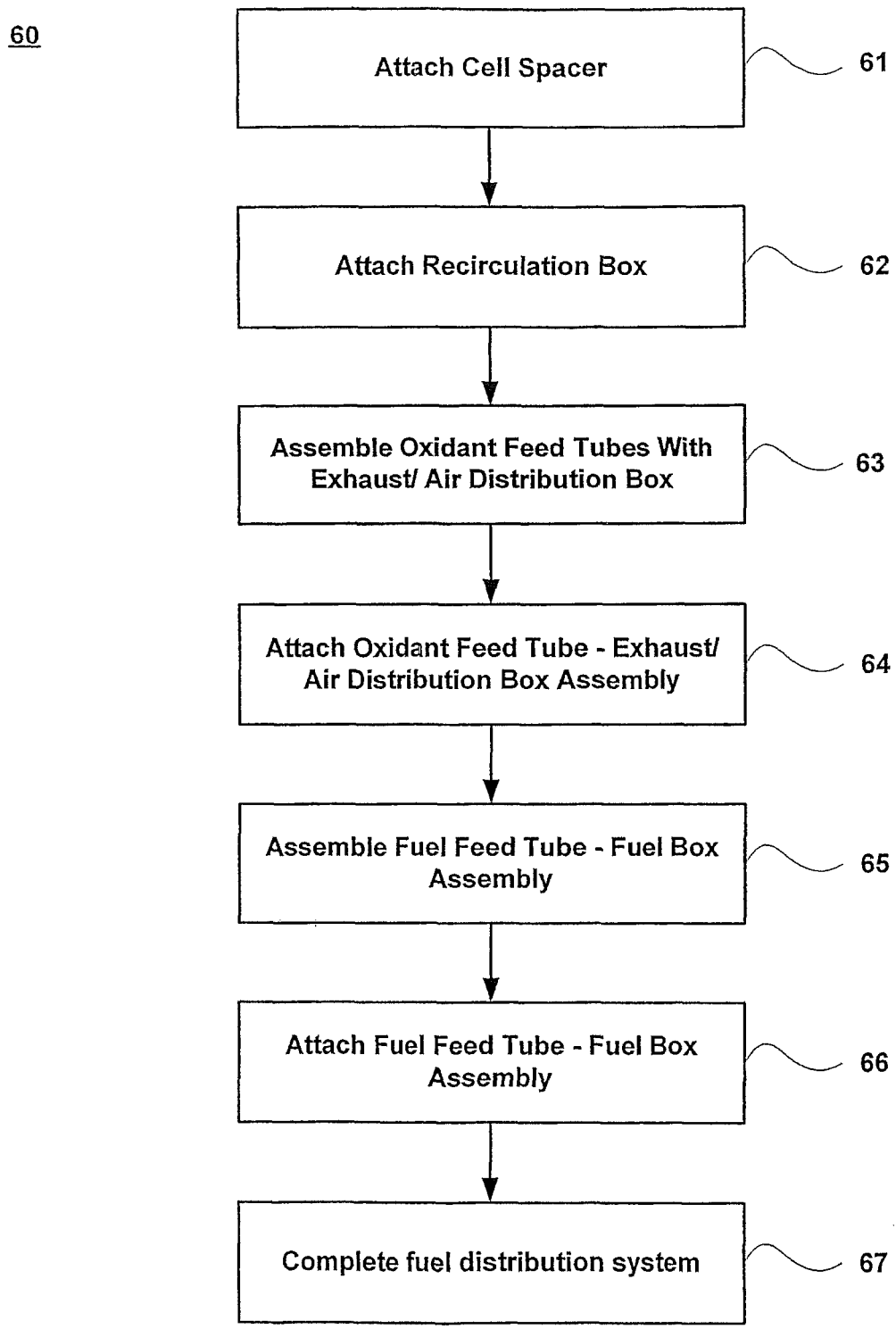
FIG. 12 illustrates an operational process for assembling the multi-function SOFC bundle of FIG. 1A according to one embodiment.

FIG. 12 illustrates an operational process 60 for assembling the multi-function SOFC bundle of FIG. 1A according to one embodiment. The assembly of the multi-function bundle 10 according to the current embodiment may be best understood with reference to FIG. 1B. In operation 61, the cell spacer 29 is attached to the primitive bundle 12 relative to the open ends of the SOFCs 13.

After the cell spacer is attached in operation 61, the recirculation box 17 is attached to the primitive bundle 12 relative to the open ends of the SOFCs 13 in operation 62. In the current embodiment, the top of the recirculation box 17 comes in contact with the cell spacer 19 attached in operation 61.

In operation 63, the oxidant feed tubes 14 are combined with the EAB 18. In one embodiment, an oxidant feed tube extender 14a is attached (e.g., with ceramic paste) to the end of each oxidant feed tube 14. The outside diameter of the lower portion of the oxidant feed tube extender 13a may be less than the diameter of the EAB box clearance holes 18b to allow for alignment adjustments. Alternatively, the oxidant feed tubes 14 may be placed into individual seats in the EAB flat plate 18a. Ceramic paste may be applied to the oxidant feed tubes 14 or to the seats to bond the oxidant feed tubes 14 to the EAB 18.

After the oxidant feed tubes 14 are combined with the EAB 18 in operation 63 (and after the recirculation box 17 is attached to the primitive bundle 12 in operation 62), the oxidant feed tube/EAB combination is attached to the primitive bundle 12 relative to the open ends of the SOFCs 13 in operation 64. In the current embodiment, the top of the EAB 18 comes in contact with the bottom of the recirculation box 17.

In one embodiment, the recirculation box 17 has a bottom plate 17a. The cell spacer 29, the recirculation box bottom plate 17a, and the EAB flat plate 18a each have a plurality of clearance holes therein. Each hole in the cell spacer 29 is aligned with a corresponding hole 17b in the recirculation box bottom plate 17a, which is in turn aligned with a corresponding hole 18b in the EAB flat plate 18a. In one embodiment, the cell spacer 29, the recirculation box bottom plate 17a, and the EAB flat plate 18a each have thirty-six holes (i.e., one for each SOFC 13 in the primitive bundle 12). Note that other numbers of cells may be used to make the array. The diameter of the holes in the cell spacer 29 is preferably slightly larger than the outside diameter of the SOFCs 13. Thus, the ends of the SOFCs 13 in the primitive bundle 12 are aligned with and passed through the cell spacer 29. The diameter of the holes 17b in the recirculation box bottom plate 17a is less than the outside diameter of the SOFCs 13. Thus, the ends of the SOFCs 13 cannot pass through the recirculation box plate 17a.

Each SOFC 13 may have an associated cell extender 13a. The cell extender 13a may be made from a ceramic material having thermal expansion characteristics comparable to those of the cell 13 (for example, zirconia or forsterite) and may be bonded to the end of the cell 13 with ceramic paste. The outside diameter of the cell extender 13a may be less than the diameter of the recirculation box clearance holes 46a to allow for thermal expansion and/or alignment adjustments. The cell extender 13a may include a shoulder 13b having a diameter greater than the diameter of the recirculation box clearance holes 46a. The shoulder 13b rests on the recirculation box bottom 17a and provides load-bearing support for the SOFC 13. The inner diameter of the cell extender 13a is greater than the outside diameter of the oxidant feed tube 14 such that oxidant can flow in the space defined between the cell extender 13a and the oxidant feed tube 14.

In addition to providing load support, the cell extender 13a prevents the depleted air from reacting with depleted fuel at the open end of the SOFC 13. The cell extender 13a also protects the open end of the SOFC 13 from wearing due to mechanical load and/or burning.

In operation 65, the top of the fuel feed tube assemblies 16 are inserted up through the appropriate holes in the CFF Spacer 20 and inserted into the corresponding appropriate holes in the bottom of the fuel box 19. The bottom of the fuel box 19 includes clearance holes to accommodate the entrance legs 40 of the fuel feed tube assemblies 16 as discussed above in conjunction with FIGS. 5A-5C. Ceramic paste is applied to the clearance between the fuel feed tube assemblies 16 and the holes in the bottom of the fuel box 19 to bond the fuel feed tube assemblies 16 to the fuel box 19.

The fuel box 19 may also have a ceramic fiber board material attached to the lower surface of its bottom. The ceramic fiber board material accommodates small differences in the length of the SOFCs 13 due to manufacturing irregularities and tolerances.

After the fuel feed tube assemblies 16 are inserted through the appropriate holes in the CFF Spacer 20, through the corresponding holes in the bottom of the fuel box 19, and bonded to the fuel box 19 in operation 65, this assembly is attached to the primitive bundle 12 in operation 66.

In operation 66 the CFF spacer 20 is located with the primitive bundle 12 relative to the closed ends of the SOFCs 13. In one embodiment, the CFF spacer 20 may be made from a thin sheet of dense ceramic material (zirconia) and may look similar to the head gasket from a conventional automotive engine. In one embodiment, the CFF spacer 20 is used to maintain the spacing between the SOFCs 13 and the fuel feed tube assemblies 16. The multi-function bundle 10 may be constructed without a CFF spacer 20 while remaining within the scope of the present invention.

In one embodiment, the multi-function bundle 10 may be placed in an oven and heated to a sintering temperature. The end loading provided by the sintering fixture collapses the ceramic fiber board material of the of the fuel box 19 locally to provide custom seating surfaces for each individual SOFC 13. In addition, a ceramic paste may be used which cures with the deformed ceramic fiberboard to maintain a custom fit between the SOFCs 13 and the fuel box 19.

After the fuel feed tube 16 and fuel box 19 combination is attached in operation 66, the remaining portion of the fuel distribution system is attached in operation 67. In one embodiment, fuel manifolds 54, an associated fuel manifold entrance port 55, and cast ceramic insulation may be added as discussed above in conjunction with FIGS. 5A-5B. Should a plurality of multi-function bundles 10 be used in a stack 22, a row header 57 and row header entrance port 58 may also be added as discussed above in conjunction with FIG. 5C. An outer shell 21 may also be added to the multi-function bundle 10 if desired, for example, in the event bundle-to-bundle separation is needed or the module consists of only one bundle.

FIG. 13 is a cut-away side view of a fuel cell module 88 according to one embodiment. The fuel cell module 88 includes a pressure containment vessel 90 and a stack 22 of multi-function bundles 10. The pressure containment vessel 90 includes a dome 91 and base 92 which may be connected together, for example, using bolts.

The inner top portion of the dome 91 includes a series of concentric spherical end-rings, where a constant radius of curvature alternates between positive and negative for each progressively larger concentric ring. The progressive radial corrugations may result in an average external insulation thickness of 1.0 in. The corrugations also provide enough internal space to accommodate the recirculation flow passages without sacrificing active length.

In one embodiment, the dome's 91 configuration (with two radial corrugations (four diametral)) is similar to the ends of a conventional soup can. The dome 91 is designed to avoid bulging outward during normal operation. However during an overpressure condition, the dome 91 can bulge outward providing a built-in mechanism to rapidly relieve the excess pressure and absorb excess energy. Although the dome 91 may have to be replaced after such an incident, a potentially dangerous explosion can be avoided.

Figure 14:
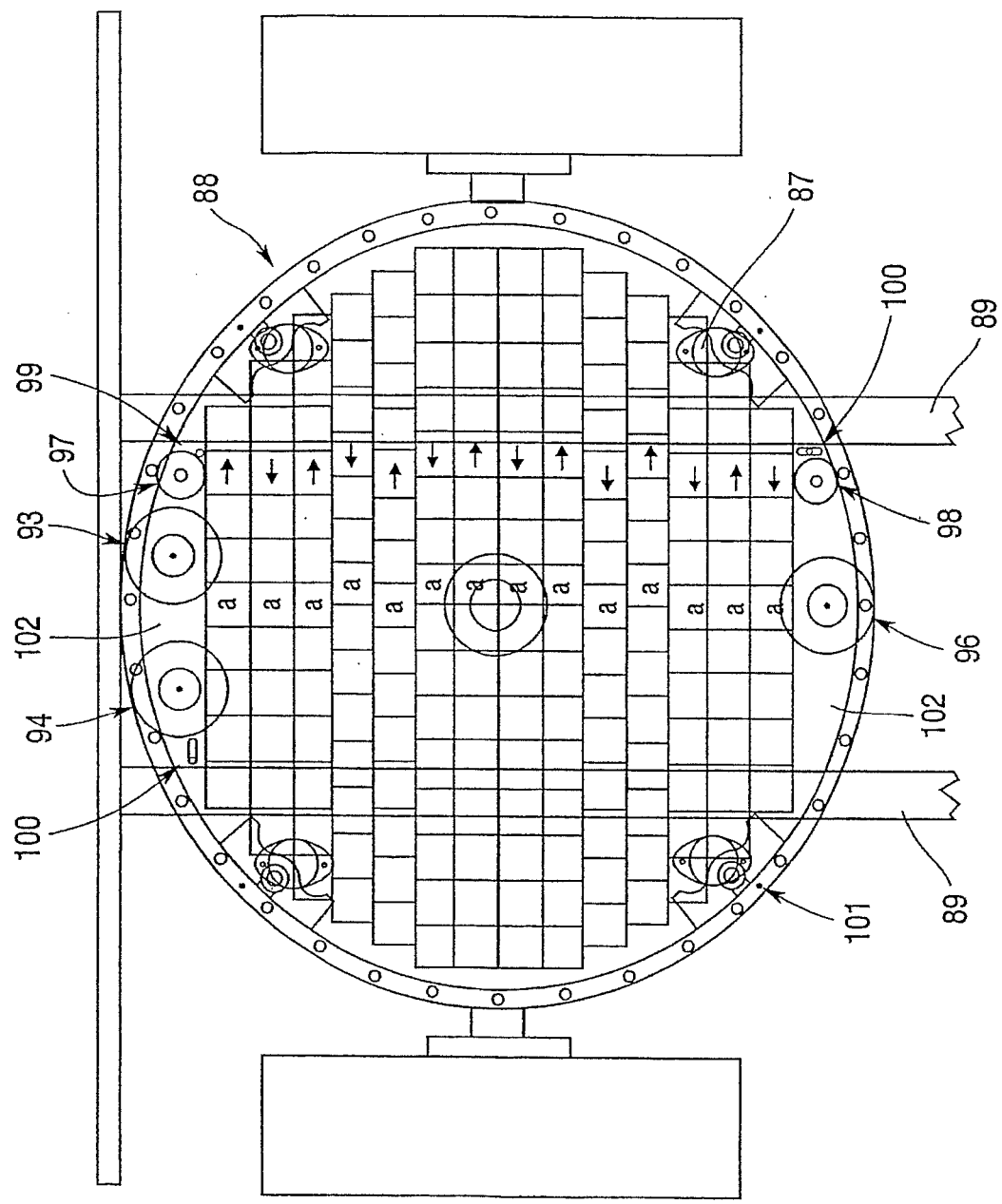
FIG. 14 is a partial top view of the fuel cell engine of FIG. 13 mounted on a truck chassis according to one embodiment.

Referring briefly to FIG. 14, the base 92 includes a recirculation entrance port feed through 93, a recirculation exit port feed through 94, an oxidant inlet port feed through 95, an exhaust port feed through 96, a positive electric terminal feed through 97, and a negative electric terminal feed through 98, among others. The base 92 may also include one or more module mounts 87 for securing the containment vessel 90, for example, to a vehicle chassis.

The base 92 serves as a fixture to provide a suitable foundation for assembling the multi-function bundles 10 into a stack 22. Returning to FIG. 13, the base 92 may include a rigid base plate 92a and a spherical outer wall 92b. Preferably, interactions between the stack 22 and the containment vessel 90 are limited to the stack's 22 contact with the base plate 92a. As a result, the upper end of the stack 22 can grow and shrink thermally within the pressure containment vessel 90 without constraint from the dome 91. The rigid base plate 92a provides a flat internal load bearing surface which may be supported by the spherical outer wall 92b. For example, the spherical outer wall 92b may include a ledge around its inner circular perimeter on which the rigid base plate 92a may rest. The rigid base plate 92a may form a false bottom relative to the spherical outer wall 92b. Thus, the rigid base plate 92a takes advantage of the rigidity of the outer spherical wall 92b while providing a means for oxidant flow distribution throughout the fuel cell module 88. With proper oxidant flow distribution, a uniform temperature may be maintained throughout the whole base plate 92 and thermal stress can be essentially eliminated. Additionally, the whole base plate 92 thermally isolates the bottom of the stack 22 from the external environment.

The rigid base plate 92a offers a flat reference plane during assembly of the stack 22 and remains flat throughout the operational range of the fuel cell module 88. Thus, the rigid base plate 92a prevents undesirable movement of the stack 22. For example, the rigid base plate 92a prevents excessive relative motion (which would result in surface fretting) between adjacent multi-function bundles 10 in the stack 22 during both normal operating conditions and during unusual conditions such as shock loading when the body forces can vary by as much as an order of magnitude.

As illustrated in FIG. 13, rigid base plate 92a is a circular plate that rests on the ledge around the inner circular perimeter of the spherical outer wall 92b. In addition, several supports 92c project upward from the spherical outer wall 92b to help support the rigid base plate 92a. In one embodiment, the rigid base plate 92a may be configured from webbed beam structures such as an "I" beam, which provide high strength per weight. The small "I" beams may be placed side-by-side and joined together to form a honeycomb structure.

FIG. 13 also illustrates the process gas flows throughout the fuel cell module 88 with respect to different activity zones. The small arrows represent the flow of various process gas. In one embodiment, the rigid base plate 92a includes three different rings of holes 92d to allow oxidant to move upward from the oxidant inlet port feed through 95 and into the EABs 18 of the multi-function bundles 10 of stack 22. Each EAB 18 has an open bottom to accommodate the oxidant flowing up through the holes in the rigid base plate 92a. The EABs 18 also have holes around the four sides to allow oxidant to flow laterally from one EAB 18 to another EAB 18.

As seen in FIG. 13, oxidant enters the fuel cell module 88 through the oxidant inlet port feed through 95 in the center of the base plate 92a. In one embodiment, the oxidant is distributed laterally in the air distribution zone 38 to all of the multi-function bundles 10 via the circular holes in the sides of the EABs 18. The oxidant enters the oxidant feed tubes 14 in each multi-function bundle 10 through circular holes in the EAB plate 18a. The fuel enters the fuel cell module 88 through the recirculation entrance port feed through 93 and is distributed to the row header entrance ports 58. The fuel then passes through the row headers 57, is distributed to the fuel manifold entrance ports 55, enters the fuel manifolds 54, and is distributed to the fuel feed tube assemblies 16.

After the fuel and oxidant electrochemically react in the active zone 32, the depleted fuel mixture arrives at the exit of active zone 32 (i.e., next to the recirculation zone 34). The depleted fuel mixture contains un-reacted fuel and reaction products (for example, a significant amount of water). The depleted fuel mixture passes from the active zone 32, through a set of controlled leakage seals (not shown), and into the recirculation zone 34. A portion of the depleted fuel mixture is extracted from the recirculation zone 36 via the recirculation exit port feed through 94 and fed to an external partial reformer via a re-circulated fuel loop and back to the recirculation entrance port feed through 93.

The remaining portion of the depleted fuel mixture passes from the recirculation zone 34, through a lower set of controlled leakage seals (not shown), and into the combustion zone 36. Combustion occurs immediately as the fuel mixture combines with depleted oxidant entering the combustion zone 36 from the open ends of the SOFCs 13. The combustion exhaust is then expelled from the fuel cell module 88 via the exhaust port feed through 96.

The electricity generated by the stack 22 of multi-function bundles 10 may be routed via leads (not shown) to an electric drive (not shown) via positive electric terminal feed through 97 and a negative electric terminal feed through 98. The electric drive may be used, for example, to drive the wheels of a truck or other vehicle.

To reduce overall weight, the dome 91 is not used to provide structural support to the stack 22, nor as a means to lift the fuel cell module 88. However, the dome's 91 flange, when properly bolted to the base plate 92a, provides a small amount of structural rigidity to the base plate 92a. The stack 22 is designed to be self-supporting when combined with the base 92, and therefore requires no support from (nor interaction with) the dome 91. The fuel cell module 88 may be lifted either from below (for example, by a fork-lift applied underneath the base plate to the thick ring support section), or from above (for example, using a special fixture that hooks into lifting holes 101 drilled into the base 92).

Little or no relative movement between the bottom of the stack 22 (i.e., the EABs 18) and the rigid base plate 92a is expected during normal operating conditions. However, in the event of unusual conditions such as an unusually large temperature differential, the stack 22 is allowed to move relative to the rigid base plate 92a without resulting in adverse loads. To control relative movement, the stack 22 may be pinned to the rigid base plate 92a.

The pin locations according to one embodiment are best seen in FIG. 14 which is a partial top view of the fuel cell module 88 of FIG. 13 mounted on a truck chassis 89. A reference pin 99 is located next to a positive electric terminal feed through 97. All relative movement between the stack 22 and the rigid base plate 92a will occur with respect to this reference pin 99. Two additional pins, called single-plane location pins 100, are also used to control stack 22 movement relative to the rigid base plate 92a. As illustrated in FIG. 14, a single-plane location pin 100 located next to a negative electric terminal feed through 98 (near the exhaust port feed through 96) allows the stack 22 to move relative to the rigid base plate 92a in a first direction. Likewise, a single-plane location pin 100 located next to the recirculation exit port feed through 94 allows the stack 22 to move relative to the rigid base plate 92a in another direction.

In one embodiment, all three location pins (the reference pin 99 and the two single-plane location pins 100) are rigid parts of the base plate 92a. The reference pin 99 fits into a tight clearance hole in an EAB end piece 102. The single-plane location pins 100 will each fit into tight clearance slots; the pin 100 next to the negative electric terminal feed through 98 only allows relative movement in the lateral front-to-back direction while the other pin 100 (next to the recirculation exit port feed through 94) only allows relative movement in the lateral side-to-side direction.

In addition to controlling the location of the stack 22 relative to the rigid base plate 92a, the location pins 100 may act as shear pins which prevent the stack 22 from undesirable movement during unusual shock loading. These pins 100 may be designed, for example, to accommodate a lateral shock load of 10 g's including a safety factor of 2×.

FIG. 15 is an isometric view of a stack 22 of multi-function fuel cell bundles 10 and associated support structures for the fuel cell module 88 of FIG. 13 according to one embodiment. The stack 22 consists of the desired number of rows of multi-function bundles 10 placed next to each other in the proper order, surrounded at the bottom by EAB end/side pieces 102, and surrounded at the middle and top by riser end/side pieces 103. A lower band 104 surrounds and holds the EAB end/side pieces 102 and an upper band 105 surrounds and holds the riser end/side pieces 103.

As illustrated in FIG. 15, the EAB end/side pieces 102 surround the EABs 18 and all together, form a structural support base for the stack 22 allowing it to make uniform contact with the rigid base plate 92a. The interface contact between the EAB end/side pieces 102 and the rigid base plate 92a provides a seal around the oxidant distribution zone of the stack 22. The seal is the result of intimate contact between the top surface of the base plate 92a and the bottom surface of the EAB end/side pieces 102.

The riser end/side pieces 103 are located directly above the EAB end/side pieces 102. The risers 103 may be made from a low-strength (low-density) ceramic material that provides thermal insulation. The additional height of the EAB end pieces 102 (relative to the EAB side pieces 102) is set to accommodate the process gas flow ducts since the riser material is unable to provide any significant structural strength. For example, FIG. 15 shows an outline (dashed lines) of an exhaust port 107 in the EAB end piece 102. The exhaust port 107 aligns with the exhaust port feed though 96 of the base 92. A recirculation exit port (not shown) is configured similarly in the EAB end piece 102 at the opposite end of the stack 22.

The stack 22 may be held together as a unit by two circumferential bands. In one embodiment, an upper band 105 may be at the height of a tongue-and-groove location on the fuel box 19 and the lower band 104 is at the height of the EAB 18 tongue-and-groove locations. As previously mentioned in addition to ensuring the relative location of adjacent bundles, the tongue-and-groove fits also enhance the zone-to-zone sealing capability. The tongue-and-groove fits allow the stack 22 to endure large loads (such as those encountered during shock loading), without significant and potentially damaging relative movement. Large relative movement normal to the axis of the tongue-and-groove is prevented. However, very small relative movement normal to the axis of the tongue-and-groove can occur when the edge friction forces are overcome, but the amount of relative movement is limited to the stack-up of the movements of the "tongues" within the clearance of the "grooves".

The clamping force provided by the bands 104, 105 holds the edge surfaces of the multi-function bundles 10 in contact with each other and thereby allows the stack 22 to act kinematically as a single unit. As a result, the force required to resist lateral shock loads is a constant regardless of the number of bundles 10 in the stack 22 (although additional rows of bundles increase the mass, they also proportionately increase the effective moment arm).

Although there are similarities, the upper band 105 may be significantly different than the lower band 104. Both upper 105 and lower 104 bands must accommodate hang-up and friction loads resulting from relative movement between the bottom of the stack 22 and the rigid base plate 92a, between the tongue-and-groove elements, and between the band 104; 105 and the material underneath the band (e.g., EAB side piece 102, riser end/side piece 103, etc.). In addition, both upper 105 and lower 104 bands must accommodate lateral shock loads and thermal expansion differences during both normal and start-up operating conditions of the fuel cell module 88.

Because the bottom of the stack 22 is pinned to the base plate 92a, the shock loading on the lower band 104 is significantly greater than that of the upper band 105. Also, the flexibility (inverse of stiffness) of the upper band 105 may be significantly greater than that of the lower band 104 to accommodate the low-strength characteristics of the risers 103 that are sandwiched between the upper band 105 and the fuel boxes 19.

In one embodiment, the lower band 104 may be 1.25 in high by 0.172 in thick. The overall thickness of the band may be achieved by combining eleven layers, each 1/64 in thick, to provide a combined thickness of 11/64 (0.172 in). The 1.25 in height is selected to be 0.25 in greater than the height of the EAB side pieces 102, thereby providing a small lip around the outer perimeter of the EAB side pieces 102 to help locate the riser side pieces 103. The lower band 104 may be made from inconel 718 which may be the same as the material of the EAB end/side pieces 102 to eliminate different thermal expansion rates. The cross-sectional area of the lower band 104 may be set to allow the band 104 to accommodate a large lateral shock load, for example, 10 g's. In addition, the cross-sectional area of the clamping-bolt (not shown) that holds the ends of the lower band 104 together may be the same (9/16-18 bolt).

During assembly and normal operating conditions, the temperature of the lower band 104 will be equal to the temperature of the EAB end/side pieces 102, therefore, there will be no thermal growth difference. Thus, lower band 104 flexibility is not needed for assembly and normal operating conditions. However, during start-up conditions, there is a significant thermal gradient across the EAB end/side pieces 102 resulting in a difference in temperature (and thermal growth) between the EAB end/side pieces 102 and the lower band 104. The lower band 104 may yield from stress due to thermal growth difference when the average temperature of the EAB end/side pieces 102 is 800 F greater than the average temperature of the lower band 104.

Figure 16:
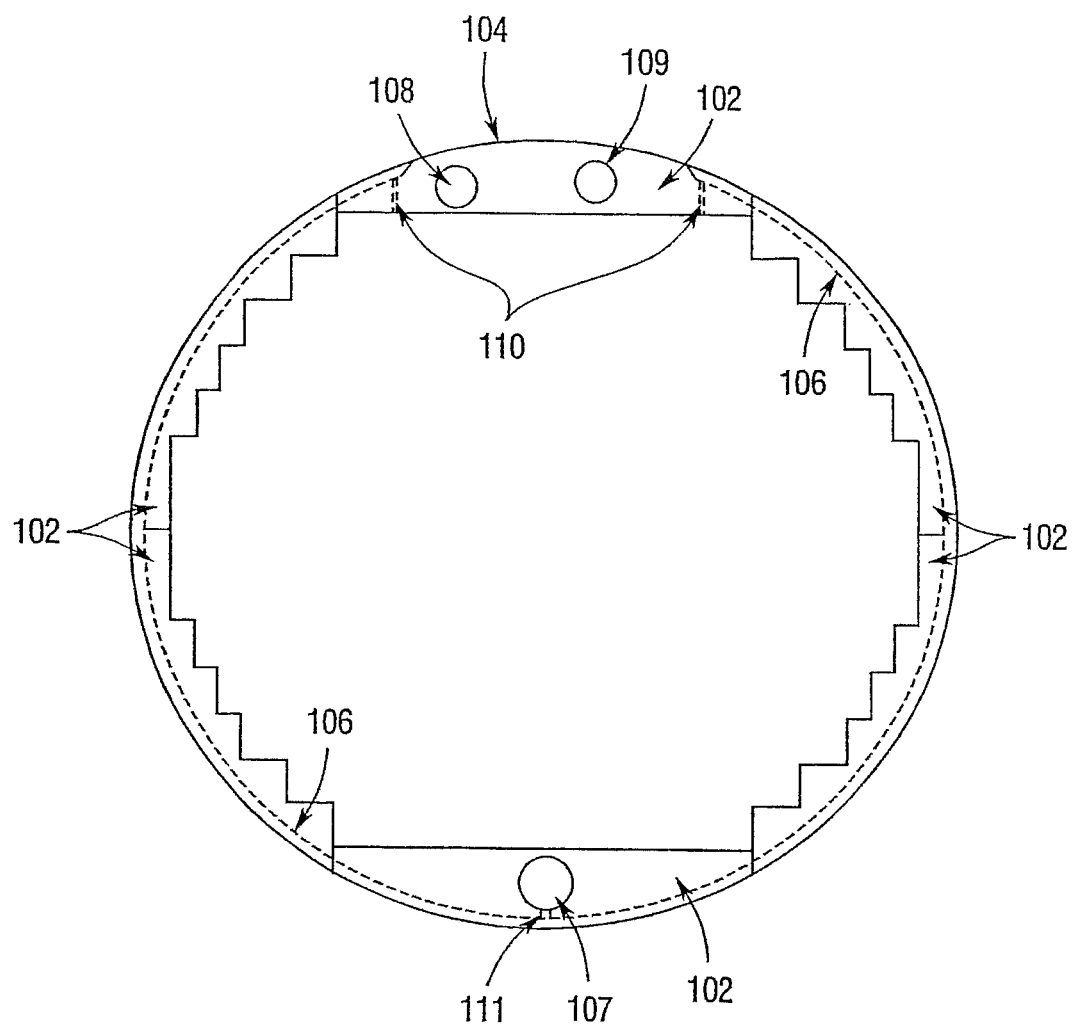
FIG. 16 illustrates the layout of the lower support structure of FIG. 15 relative to the base of the pressure containment vessel of the fuel cell engine of FIG. 15 according to one embodiment.

To make sure the average temperature of the EAB end/side pieces 102 cannot exceed the lower band 104 average temperature by 800 F, a small bleed-off groove 106 is machined in the outer surface of the EAB end/side pieces 102, underneath the band 104. Referring briefly to FIG. 16, heated oxidant is supplied to the bleed-off groove 106 via two oxidant distribution zone links 110. The oxidant flows through the bleed-off groove 106 and exits via an exhaust link 11 connected to the exhaust system. In one embodiment, the bleed-off groove 106 may be 0.25 inches wide by 0.25 inches deep. At the recirculation end of the stack 22, the groove 106 is linked to the oxidant distribution zone by two separate 0.25 inch diameter oxidant distribution zone links 110 drilled through the EAB end piece 102. At the exhaust end of the stack 22, the groove 106 is linked to the exhaust by a 0.35 inch diameter exhaust link 111 in the EAB end piece 102. FIG. 11 shows the overall layout of the bleed-off groove 106 arrangement for the lower band 104.

In one embodiment, the lower band 104 may be made from a high strength steel (for example, inconel 718) whereas the EAB 18 and EAB end/side pieces 102 may be made from a ceramic material (for example, alumina) having a thermal expansion rate significantly lower than that of the lower band 104. Clamping bolts (not shown) may be used to hold the ends of the lower band 104 together and provide sufficient preload on the lower band 104 to maintain the desired clamping load during assembly, normal operating conditions, and start-up/shut-down conditions. The small bleed-off groove 106 may be used to provide oxidant flow to maintain the temperature of the EAB end/side pieces 102 at a temperature near the temperature of the lower band 104.

The above-described embodiments of the invention are intended to be illustrative only. Numerous alternative embodiments may be devised by those skilled in the art without departing from the scope of the following claims. For example, the electrodes of the SOFCs 13 may be reversed such that the oxidant electrode forms the outside surface and the fuel electrode 26 forms the inside surface of the SOFC 13. With a few modifications, the fuel supply system and the oxidant supply system may be reversed in this embodiment. More specifically, the feed tubes inserted into each SOFCs 13 are used to supply fuel to the fuel electrode. Fuel is supplied to these feed tubes using the EAB. These feed tubes may include a catalyst material to aid fuel reformation. Additionally, the feed tube assemblies inserted between each fuel cell are used to supply oxidant to the oxidant electrodes. Oxidant is supplied to these feed tube assemblies using the fuel manifolds. These feed tube assemblies do not need a catalyst material.

What is claimed is:

1. A fuel cell bundle comprising:
an array of tubular fuel cells; and
a flexible electrical connector disposed between a first tubular fuel cell and a second tubular fuel cell, wherein the flexible electrical connector comprises a non-porous sheet material having at least two curved surfaces, a first contact for coupling with the first tubular fuel cell and a second contact for coupling with the second tubular fuel cell, and at least one of the first and second contacts comprises a flexible member.

2. The fuel cell bundle of claim 1 wherein the flexible electrical connector has a generally oval-shaped cross-section.

3. The fuel cell bundle of claim 1 wherein the flexible electrical connector comprises nickel.

4. A fuel cell bundle comprising:
an array of tubular fuel cells; and
a flexible electrical connector disposed between a first tubular fuel cell and a second tubular fuel cell, wherein the flexible electrical connector comprises a non-porous sheet material having at least two angled surfaces, a first contact for coupling with the first tubular fuel cell and a second contact for coupling with the second tubular fuel cell, and at least one of the first contact and second contact comprises a flexible member.

5. The fuel cell bundle of claim 4 wherein the flexible electrical connector has a generally bow-tie-shaped cross section.

6. A fuel cell bundle comprising:
an array of tubular fuel cells; and
a flexible electrical connector disposed among a 2×2 array of tubular fuel cells comprising a first tubular fuel cell, a second tubular fuel cell, a third tubular fuel cell and a fourth tubular fuel cell, wherein the flexible electrical connector has a generally V-shaped cross-section and comprises a non-porous sheet material having a bend, a first contact for coupling to the first tubular fuel cell, a second contact for coupling to the second tubular fuel cell, a third contact for coupling to the third tubular fuel cell and a fourth contact for coupling to the fourth tubular fuel cell, and at least one of the first, second, third and fourth contacts comprises a flexible member.

7. The fuel cell bundle of claim 1 wherein the flexible electrical connector has a generally S-shaped cross-section.

8. The fuel cell bundle of claim 7 wherein the sheet material is electrically conductive.

9. The fuel cell bundle of claim 1, wherein the sheet material is electrically conductive.

10. The fuel cell bundle of claim 7 wherein each of the first contact and the second contact comprises an outer concave surface.

11. The filet cell bundle of claim 8 wherein each of the first contact and the second contact comprises an outer concave surface.

12. The fuel cell bundle of claim 1 wherein each of the first contact and the second contact comprises an outer concave surface.

13. The fuel cell bundle of claim 4 wherein the flexible electrical connector has a generally rectangular-shaped cross section.

14. The fuel cell bundle of claim 4 wherein the flexible electrical connector has a generally Z-shaped cross section.

15. The fuel cell bundle of claim 14 wherein the sheet material is electrically conductive.

16. The fuel cell bundle of claim 4 wherein the sheet material is electrically conductive.

17. The fuel cell bundle of claim 14 wherein each of the first contact and the second contact comprises an outer concave surface.

18. The fuel cell bundle of claim 15 wherein each of the first contact and the second contact comprises an outer concave surface.

19. The fuel cell bundle of claim 4 wherein each of the first contact and the second contact comprises an outer concave surface.

* * * * *